(12) United States Patent
Sirois

(10) Patent No.: US 11,004,005 B1
(45) Date of Patent: May 11, 2021

(54) ELECTRONIC PROBLEM SOLVING BOARD

(71) Applicant: MASSACHUSETTS MUTUAL LIFE INSURANCE COMPANY, Springfield, MA (US)

(72) Inventor: Jamie Sirois, Springfield, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 882 days.

(21) Appl. No.: 15/721,039

(22) Filed: Sep. 29, 2017

Related U.S. Application Data

(60) Provisional application No. 62/405,117, filed on Oct. 6, 2016.

(51) Int. Cl.
*G06N 5/04* (2006.01)

(52) U.S. Cl.
CPC .................... *G06N 5/045* (2013.01)

(58) Field of Classification Search
CPC ........... G06N 5/045; G06N 5/02; G06N 5/022
USPC .......................................................... 706/11
See application file for complete search history.

(56) References Cited

U.S. PATENT DOCUMENTS

| | | | | |
|---|---|---|---|---|
| 9,299,025 | B1* | 3/2016 | Rubin | G06N 5/025 |
| 10,410,219 | B1* | 9/2019 | El-Nakib | G06F 16/90332 |
| 2001/0052108 | A1* | 12/2001 | Bowman-Amuah | |
| | | | | G06Q 10/06 |
| | | | | 717/100 |
| 2011/0055699 | A1* | 3/2011 | Li | G06F 16/951 |
| | | | | 715/709 |
| 2011/0208788 | A1* | 8/2011 | Heller | G06F 8/30 |
| | | | | 707/810 |
| 2011/0302090 | A1* | 12/2011 | Newpol | G06Q 10/06 |
| | | | | 705/301 |
| 2013/0325893 | A1* | 12/2013 | Asay | G06Q 10/083 |
| | | | | 707/769 |
| 2014/0195463 | A1* | 7/2014 | Jacobs | G06Q 30/02 |
| | | | | 706/11 |
| 2014/0222485 | A1* | 8/2014 | Cantor | G06Q 10/06 |
| | | | | 705/7.22 |
| 2014/0236654 | A1* | 8/2014 | Cantor | G06Q 10/063114 |
| | | | | 705/7.15 |
| 2015/0127583 | A1* | 5/2015 | Allgaier | G06N 5/04 |
| | | | | 706/11 |
| 2016/0274961 | A1* | 9/2016 | Thomas | G06F 11/079 |
| 2016/0307134 | A1* | 10/2016 | Cantor | G06Q 10/0633 |

(Continued)

*Primary Examiner* — Dave Misir
(74) *Attorney, Agent, or Firm* — Foley & Lardner LLP

(57) ABSTRACT

A system and method for an e-problem solving board is disclosed. Said e-problem solving board allows automated classification and management of one or more problems. In some embodiments, the method uses one or more machine learning algorithms for classifying problems according to their complexity. In other embodiments, the method uses collaborative filtering algorithms for classifying the complexity of the problem. In these embodiments, the method uses collaborative filtering algorithms for assigning employees to problems and providing a set of suggestions to address the one or more problems. In some embodiments, the system provides status reports regarding the one or more problems. In other embodiments, the system allows multiple teams, operating in different geographic locations, to work on a single problem. Further to these embodiments, the system allows users to track and continually update problems.

18 Claims, 25 Drawing Sheets

(56) References Cited

U.S. PATENT DOCUMENTS

2018/0032971 A1* 2/2018 Karuppasamy ........ G06N 5/003

* cited by examiner

| 400 | PROBLEM NAME | NUMBER OF DEPTS. AND PARTIES INVOLVED | PROBLEM SOLVING TOOLS | PROBLEM DESCRIPTION |
|---|---|---|---|---|
| | 402 | 404 | 406 | 408 |
| | | | | |
| | | | | |
| | | | | ... |
| ... | | | | |

FIG. 4

| PROBLEM NAME | COMPLEXITY | ASSIGNED EMPLOYEES | SUGGESTIONS |
|---|---|---|---|
| 502 | 504 | 506 | 508 |
| ... | | | |
| | | | ... |

| PROBLEM NAME | PROBLEM STATUS | IDENTIFIED DATE | DATE COMPLETED | PROBLEM COMPLEXITY | KPI |
|---|---|---|---|---|---|
| PROBLEM 1 | ON HOLD | | | | |
| | | | | | |
| | | | | | |
| ... | ... | ... | ... | ... | ... |

*FIG. 6*

| OPPORTUNITY DESCRIPTION | FIRST KPI MEASURE | SECOND KPI MEASURE | TOTAL BENEFITS |
|---|---|---|---|
| | | | |
| | | | |
| | | | |
| ... | ... | ... | ... |

ELECTRONIC PROBLEM SOLVING BOARD

CROSS-REFERENCE TO RELATED APPLICATIONS

This application claims priority to U.S. Provisional Patent Application Ser. No. 62/405,117 filed on Oct. 6, 2016, which is hereby incorporated by reference in its entirety.

FIELD OF THE DISCLOSURE

The present disclosure relates in general to computer based problem tracking systems, and more specifically, to systems and methods for automated problem classification and automated problem management.

BACKGROUND

Organizations can have diverse business groups that may measure their performance by keeping track of a set of key performance indicators (KPIs). Sometimes, problems arise in the organization's processes that cause business groups to fail when trying to meet one or more key performance indicators. Examples of key performance indicators include maintaining products or services below a desired cost threshold, meeting date/time commitments associated with deliverables, and the like.

Identifying problems and resolving problems are useful processes in assessing the operational efficiency of an organization. It is desirable to measure how well this process is performing and attempt to decrease the time to a resolution. There are different approaches for identifying a problem and resolving that problem. In one example using a JDI (just do it)/A3 approach, a problem is defined, a goal is identified, a root cause is identified, and countermeasures are implemented. In another example using a Kaizen approach, a process map is generated, a value stream map is generated, an improvement plan is generated, risk analysis is performed, and a solution is implemented. In yet another example using a Lean Six Sigma approach, a requirements map is generated, a baseline measurement is obtained, a solution is mapped, and a pilot is implemented. Regardless of the approach, these problem identification and resolution approaches are inefficient and cause wasted resources in solving problems.

Therefore, problem management skills are useful for maintaining productivity of an organization. However, inefficiencies can arise when there are no or limited mechanisms for avoiding outdated information, duplicated efforts, poor prioritization of problems, and delays in problem resolution.

Members of a team need constant communication among each other when working on a problem. However, the physical exchange of information is difficult when some team members are working from different geographic locations. Thus, there is a need for providing systems and methods to address these and other concerns.

Conventional computer-based systems do not efficiently identify problems, track problems, and propose solutions, and the conventional computer-based solutions may require manual input for updating. Further, there is no capability to identify recurring problems, identify problems that have been solved by others, or automatically update a status of a solution attempt to a problem. Furthermore, conventional computer-based systems do not provide a streamlined interface and alert system for a user to receive timely notifications and react to the notifications.

SUMMARY

The systems and methods described herein attempt to cure the deficiencies of the conventional computer-based systems by more efficiently identifying problems, tracking problems, proposing solutions, updating records of problems, identifying recurring problems, identifying problems that have been solved by others, and updating a status of a solution attempt to a problem. More particularly, the systems and methods described herein describe a back-end analytics engine that intelligently identifies, based on metadata, data records containing information on the problems solved in the past. Furthermore, the analytics engine generates a user alert transmitted to and rendered on a user device, wherein the user alert includes text indicating a predicted solution to the identified problem. These and other functionalities are performed by a computer more efficiently than conventional computer-based systems, and many of these actions can be performed dynamically or automatically based upon a trigger or action in the system.

In some embodiments, systems and methods for automated problem classification and problem management are disclosed. The system coordinates multiple algorithms for classifying problems, assigning employees to problems, suggesting a set of recommendations for addressing the problems, and the like.

The system includes one or more client computing devices connected to one or more servers via a network connection. In this embodiment, the one or more servers include an analytics engine that further includes a data extraction module and data processing module. In some embodiments, the one or more servers are coupled to a database.

In operation, a client computing device allows a user to provide problem data as user input via a user interface. The problem data includes one or more characteristics associated with a problem. Next, the user requests solution data through the computing device via the user interface. An analytics engine then classifies the complexity of the problem based on the provided problem data. Next, the analytics engine retrieves company data, such as, a set of one or more available employees. The analytics engine can display a user interface containing a listing of team members for an assignment, whereby a user can select one or more team members for the assignment. The team members in the listing can be ranked according to prior experience or other criteria. In one embodiment, based on the problem complexity and the available employees, the analytics engine can assign employees that have a good performance track record addressing substantially similar problems in the past. Additionally, the analytics engine uses the problem complexity and the problem description associated with the problem for generating a suggestion for the problem solving approach to the problem. Also, when the user performs a search, the analytics engine can identify related problems that were already resolved.

In some embodiments, a sub-system of the system includes an analytics engine that further includes a data extraction module and a data processing module. In these embodiments, the data extraction module receives the user input from client computing devices, extracts problem data and/or user requests from said user input, and provides the problem data and/or user requests to the data processing module. Further to these embodiments, data extraction module retrieves company data from a database. In some embodiments, data processing module is configured to receive problem data and/or user requests and the company data from the data extraction module, produce solution data (e.g., by obtaining from a database a description of the problem, a status of the problem, and/or a solution to the problem, whether identified by the data processing module or inputted by a user) from said problem data and company data, and provide said solution data to a user through client computing devices. In these embodiments, the data processing module is further configured to produce a status report based on the problem data and the solution data, and provide the status report to a user through client computing devices.

According to some embodiments, a method for automated problem classification and problem management includes a client computing device allowing a user to enter user input such as problem data and/or user requests. In these embodiments, the user requests for solution data. Further to these embodiments, the analytics engine classifies the complexity of the problem, based on problem data, using one or more predictive analytics. Next, the analytics engine can display a user interface containing a listing of team members for an assignment, whereby a user can select one or more team members for the assignment. In one embodiment, based on the problem complexity and the available employees, the analytics engine can automatically indicate, identify, or assign employees that have a good performance track record addressing substantially similar problems in the past. Additionally, the analytics engine uses the problem complexity and the problem description associated with the problem for generating a suggestion for the problem solving approach to the problem. Further to these embodiments, the assignment of employees to the problem is performed by assigning available employees from problem groups substantially similar to the problem under analysis. In some embodiments, the analytics engine provides a set of suggestions, based on suggested solutions from problem groups substantially similar to the problem under analysis.

According to some embodiments, the analytics engine classifies the complexity of a problem by using one or more machine learning algorithms. In these embodiments, processing the problem data allows the classification of the problem based on one or more of the constituent data elements contained within the problem data. Further to these embodiments, machine learning algorithms include robust regression, k-Nearest Neighbors, support vector regression, Gaussian process regression, and the like. In some embodiments, said problem classification is performed by the data processing module of the analytics engine.

In other embodiments, the analytics engine determines the complexity of a problem using one or more collaborative filtering algorithms. In some embodiments, key terms relate the current problem with previous problems. Further to these embodiments, the collaborative filtering algorithms employ problem data and key terms for establishing a similarity score among two or more problems that indicate the problems share a similar complexity and potential solution. Examples of collaborative filtering algorithms include nearest neighbor mechanism, shilling attacks, Bayesian networks, clustering models, Pearson correlation, hybrid collaborative filtering algorithm approaches, and the like.

According to some embodiments, the analytics engine can present available employees or a team to work on a problem based on the problem complexity, company data such as employee availability, and a similarity score between the key terms associated with the current problem and the key terms associated with one or more problem groups. In an alternative embodiment, the analytics engine can virtually assembles one or more teams by generating a list of the available employees associated with the problem groups having high similarity scores to the problem under analysis. Further to these embodiments, the data processing module operating within analytics engine performs said assignment step.

According to some embodiments, the analytics engine provides one or more problem suggestions depending on the problem complexity and the similarity score between the key terms associated with the current problem and the key terms associated with one or more problem groups. Upon receiving a search query from a user entered in user interface, the analytics engine compares complexity/key terms of the problem data associated with the problem under analysis with problem groups having substantially similar complexity/key terms to identify suggested solutions. The search query may contain the complexity and/or key terms of the problem data or the analytics engine may parse the input of the user to generate a search query. Further to these embodiments, the data processing module operating within analytics engine performs said comparison step for identifying the suggested solutions.

In one embodiment, a computer-implemented method comprises: generating, by an analytics engine server, a new data record containing data representing a problem, wherein the data record is stored in a database, and the database comprises data records containing data representing problems, a status of a resolution of each of the problems, and metadata in each data record containing at least one keyword associated with the corresponding problem; generating, by the analytics engine server, a query of the metadata in the data records in the database that contain a keyword in the metadata of the data record representing a problem similar to the problem in the new data record, wherein the query is based upon metadata containing at least one keyword in the new data record; generating, by the analytics engine server, a data file containing the data records that satisfy the query; determining, by the analytics engine server, whether one of the data records in the data file that satisfies the query has a change in the status of the resolution; generating, by the analytics engine server, a graphical user interface configured for presentation on a display of a user computing device, the graphical user interface comprising a message containing data associated with the data record that has the change in the status of the resolution, wherein the data contains the problem and the status of the resolution.

In another embodiment, a computer based system comprises: a database comprising data records, wherein each data records contains data representing a problem, a status of a resolution of the problem, and metadata containing at least one keyword associated with the problem; an analytics engine server configured to: generate a new data record containing data representing a new problem; provide instructions to store the new data record in a database; generate a query of the metadata in the data records in the database that contain a keyword in the metadata of the data record representing a problem similar to the problem in the new data record, wherein the query is based upon metadata containing at least one keyword in the new data record; generate a data file containing the data records that satisfy the query; determine whether one of the data records in the data file that satisfies the query has a change in the status of the resolution; and generate a graphical user interface configured for presentation on a display of a user computing device, the graphical user interface comprising a message containing data associated with the data record that has the change in the status of the resolution, wherein the data contains the problem and the status of the resolution.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 4 illustrates a data model for structuring problem data, according to an embodiment.

FIG. 5 illustrates a data model for structuring problem data, according to an embodiment.

FIG. 6 illustrates a problem resolution progress report, according to an embodiment.

FIG. 8 illustrates key performance indicators (KPIs) reports, according to an embodiment.

FIGS. 17A to 17C illustrate instructions for the user interface, according to an embodiment.

FIG. 18 is a user interface of problems in queue according to an embodiment.

FIGS. 19A to 19E illustrate user interfaces, according to an embodiment.

DETAILED DESCRIPTION

Figure 1:
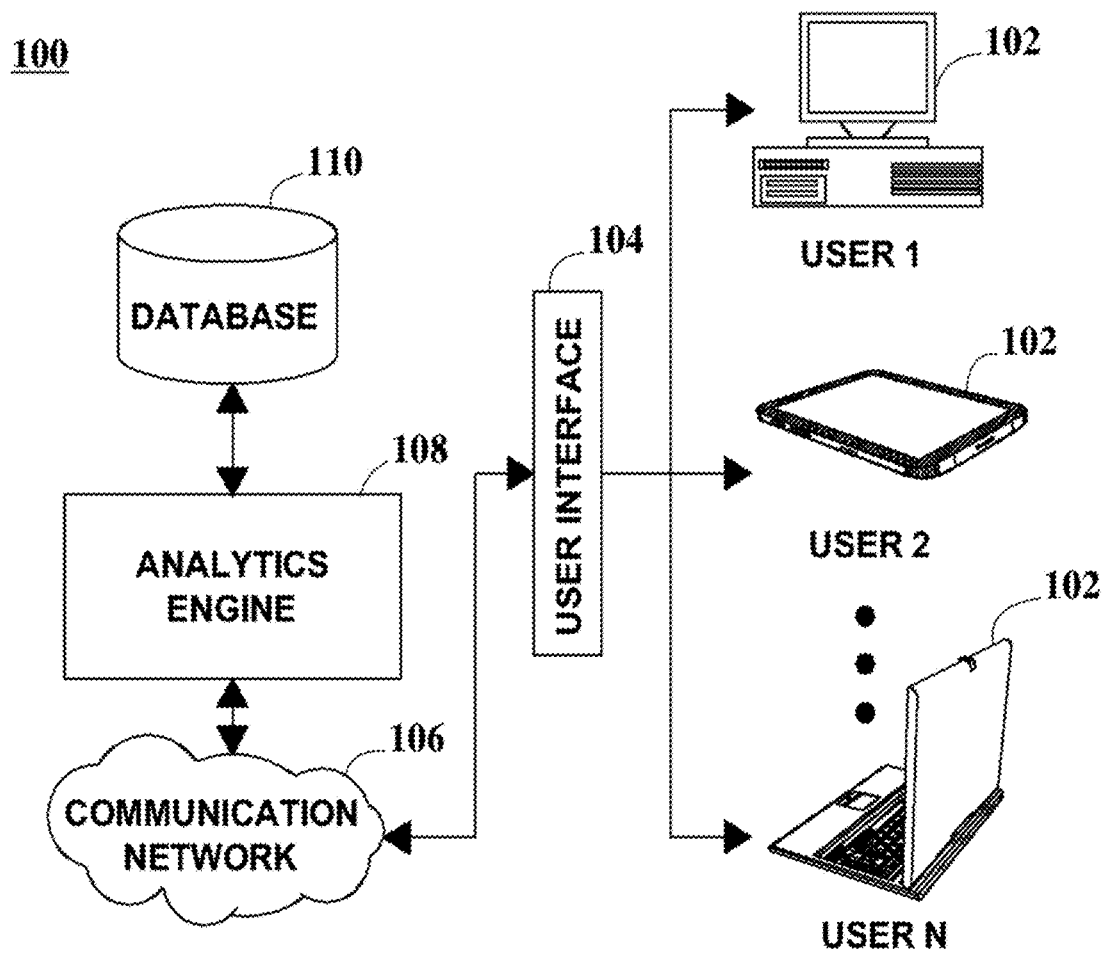
FIG. 1 is a block diagram of a system for implementing an electronic problem solving board, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Waste" refers to steps, actions or elements that do not add value to a process.

"Problem" refers to a process or system behaving below a parameter or key performance indicator. A problem can also refer to a gap between a current state and a target state. An example of a problem may be that a service requires a predetermined target condition, e.g., 95% productivity or a telephone call lasting less than 5 minutes, and there is a gap between a current condition and the target condition. This gap is also referred to as the waste.

"Completed problems" refers to problems solved and no longer being actively worked on.

"Problem management" refers to activities responsible for maintaining information regarding the life-cycle of a problem, managing resources for addressing said problem and generating potential solutions to the problem under analysis.

"Countermeasure" refers to actions that address the primary root causes of a problem.

"Collaborative filtering" refers to methods for making automatic recommendations of a user's preferences based on the preferences derived from similar users.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one having ordinary skill in the relevant art and having possession of this disclosure, are to be considered within the scope of the invention.

The computer system described herein is programmed to allow for tracking, updating, resolving, and viewing a team's problem solving efforts and can estimate a work effort involved to solve problems that have been identified. The software can estimate a number of hours needed to solve various types of problems.

FIG. 1 is a block diagram of a system for implementing an electronic problem solving board, according to an embodiment. In FIG. 1, the disclosed system architecture may be operated by an organization, entity, or company. In FIG. 1, system architecture 100 includes one or more components such as client computing devices 102, user interface 104, network connection 106, analytics engine 108, and one or more databases 110. It should be understood that system architecture 100 can include more components, less components, or different components depending on desired goals.

In some embodiments, client computing devices 102 are operatively coupled to and in bi-directional communication with network connection 106. In these embodiments, network connection 106 is operatively coupled to and in bi-directional communication with analytics engine 108. Further to these embodiments, analytics engine 108 is operatively coupled to and in bi-directional communication with database 110.

Client computing devices 102 are configured to receive user input from a user and provide the user input to one or more system components, such as, for example an analytics engine. In some embodiments, user input includes problem data and/or user requests. In these embodiments, user requests include a request for solution data and/or status reports. Further to these embodiments, problem data includes a set of one or more characteristics related to an identified problem, such as, for example problem name/opportunity, problem identification number, problem description, number of departments and parties associated with a problem, problem solving tools currently or previously employed for addressing the problem, key performance indicator (KPI) benchmark, date problem identified, and the like. Examples of problem solving tools currently or previously employed for addressing a problem include lean management techniques, such as, five whys technique, fish bone diagrams, eight wastes identification methodology, and the like.

An example of problem data includes information related to a problem of high average handling time (AHT) associated with one of the company's processes. In this example, the problem name is high AHT for updating customer information, the problem identification number is 4 (e.g., assigned sequentially by the system), and the problem description describes briefly the core elements of the problem. Further to this example, the problem only involves one department and the problem solving tools to be employed include a fishbone diagram and the five whys technique.

In some embodiments, client computing devices 102 are further configured to receive solution data and/or status reports from one or more system components, such as, an analytics engine. In these embodiments, client computing devices 102 are configured to provide the received solution data and/or status reports to users. In some embodiments, client computing devices 102 are implemented as smartphones, desktop computers, laptop computers, servers, tablets, PDAs, single computers with multiple processors, several networked computers, specialized hardware, and the like.

User interface 104 is implemented as a set of computer instructions running on client computing devices 102 that are executed by central processing units that run computer executable program instructions or related algorithms to interact with an associated user. In some embodiments, user interface 104 can be implemented as a browser or an application running on client computing devices 102. The user interface 104 or the data, information, or content of the user interface 104 can be generated by the analytics engine 108 and transmitted to client computing device 102 for display on the client computing device.

In some embodiments, network connection 106 includes hardware and associated software for allowing communications between one or more components of system architecture 100. Examples of network connection 106 include intranets, local area networks (LANs), virtual private networks (VPNs), wide area networks (WANs), the Internet, and the like.

In FIG. 1, analytics engine 108 can be a software component stored on a computer readable medium and executed by a processor, e.g., as specially-programmed software on a server (referred to as an analytics engine server). The analytics engine 108 can be configured to receive user input from client computing devices 102, receive company data from a database, produce solution data from the received user input and company data, and provide the produced solution data to client computing devices 102. In other embodiments, analytics engine 108 is further configured to store the solution data at a database.

In some embodiments, company data includes employee availability, company organization, employee geographical location, employee demographics, and the like. In these embodiments, solution data includes problem name/opportunity, problem complexity classification, workgroup recommendations, problem resolution suggestions, key performance indicator (KPI) benchmarks, other KPI measures, problem owner, and the like. Further to these embodiments, the complexity of a problem is determined based on the number of employees recommended to work on a problem, the number of department and parties involved, the tools employed for addressing the problem, and the like. In these embodiments, status report types include, but are not limited to, problem resolution progress reports (see FIGS. 6 and 7), Key performance indicators (KPIs) reports (FIG. 8), and the like. Status reports include one or more of the following data: problem name/opportunity, problem status, identified date, date completed, problem complexity, key performance indicators (KPIs), problems in queue, team members, problem owner, problem description, KPI measures, and total benefits. Status reports are further described in FIGS. 6-8.

In an example, a computing device 102 transmits a request to the analytics engine 108 for solution data for a problem related with low sales. After analytics engine 108 processes the problem data provided by the user, it provides solution data to the user through client computing devices 102. In this example embodiment, solution data describes the problem as of high complexity, recommends five employees to work on the problem and suggests that the team of employees reviews the sales incentive program, provides training to the sale employees, and reviews the marketing strategy.

In another example, a user requests a status report regarding the current status of one or more problems. In this example, analytics engine 108 provides a problem resolution phase report through client computing devices 102. Further to this example, the problem resolution phase report includes one or more problems currently under resolution, the teams assigned to said problems, the current status of the problems, and the number of problems in the problem queue.

In yet another example, a user requests a status report regarding the KPIs associated with a problem. In this example, analytics engine 108 provides a KPI report through client computing devices 102. In this example, the KPI report includes the problem name, the problem description, a first score of one or more KPIs associated with the problem at a first point in time, a second score of said KPIs associated with the problem at a second point in time, and a calculation of the total benefit or the total improvement of the problem. Further to this example, the number of scores is determined by the number of status update queries a user requests of the system.

In another example, a user requests a report of all problems identified or solved within a particular time period (e.g., within the last week or month) and/or associated with a particular individual or team. For problems identified, the analytics engine 108 can generate a report based on new data records generated and stored in the database 110. For problems solved, the analytics engine 108 can generate a report based on data records having data representing a problem that had a status change from "pending" or "in progress" to "resolved." Upon receiving a request from the user computing device (e.g., upon receiving an indication that a link has been selected in a user interface (e.g., web page), the analytics engine can generate the report by generating data configured to be presented on a user interface for display on a user computing device. Alternatively, the analytics engine can determine when a data record has a status change and dynamically generate an alert to be automatically transmitted to one or more individuals (e.g., team, team member, manager) associated with the data record. The alert can be transmitted by text message, email message, a web page or a link to a web page, or the like.

In one embodiment, the report can identify which problems are overdue for resolution. Each data record for each problem can contain data representing an expected deadline for resolution, completion of a phase of resolution, or completion of resolution. The expected deadline can be generated automatically based upon knowledge of the cause of the problem or complexity of the problem. When generating a report, the items having a date after the expected deadline can be presented with an indicator that the deadline has passed, such as by presenting the problems represented in these data records in a different color (e.g., red). A report for pending problems can include this feature, or a user computing device may request a report for only those matters that have passed the expected deadline.

Alternatively, the report can identify problems that are similar to a user's problem where the user's problem is a more advanced stage of resolution than the similar problems. As a result, the user can contact an individual or team associated with the similar problem and provide information about how to advance the stage of resolution based upon the user's experience.

In some embodiments, analytics engine 108 includes a data extraction module and a data processing module. In these embodiments, the data extraction module receives the user input from client computing devices 102, extracts problem data and/or user requests from said user input, and sends the problem data and/or user requests to the data processing module. Further to these embodiments, the data processing module is configured to receive the user input and the company data from the data extraction module, produce solution data from said user input and company data, and provide said solution data to client computing devices 102.

In some embodiments, analytics engine 108 is implemented as a set of computer instructions executed by one or more central processing units that run computer executable program instructions or related algorithms. Each central processing unit may be a component of computing devices such as a server, a single computer, or multiple computers within a distributed configuration.

In FIG. 1, database (or data store) 110 is implemented as any suitable database configured to receive, store, and provide data to authenticated requestors. In some embodiments, database 110 provides company data to analytics engine 108. In one or more embodiments, database 110 is implemented as a database management system (DBMS), such as, for example MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In exemplary operation, client computing devices 102 allows a user to provide problem data as user input via user interface 104. In this example, the problem data includes a problem involving three departments and requiring the application of one or more lean management techniques for its resolution. Further to this example, the user inputs a request for solution data through user interface 104 displayed by client computing devices 102. In this example, analytics engine 108 classifies the problem as a problem of medium complexity. Next, analytics engine 108 retrieves company data such as available employees. Based on the problem complexity and the available employees, analytics engine 108 assigns three available employees that have had an excellent performance addressing substantially similar problems in the past. Further to this example, analytics engine 108 employs the problem complexity and the problem description for providing a set of suggestions for resolving the problem under analysis. Next, analytics engine 108 provides solution data to the user through client computing devices 102. Then, analytics engine 108 stores the solution data in data records at database 110, whereby the data records are each associated with a problem and contain data representing information regarding a solution to the problem, a team or individual addressing a problem, a status of the problem, and related information.

The computing code executed by the computing devices of system architecture 100 includes programs designed and built to classify and manage problems. In some embodiments, said computing code processes multiple elements simultaneously in multi-processor environments. This allows performing large work, such as heavy calculations and time consuming analysis in a more efficient manner than other approaches such as manual work performed by humans or approaches relying on a single computer. As will become apparent, functions and operations of system architecture 100 are sufficiently complex as to require implementation on a computer system, and cannot be performed in the human mind simply by mental steps.

In some embodiments, the aforementioned computing code is suited for processing multiple elements simultaneously to solve a problem in multi-processor environments. In these embodiments, client computing devices 102 suitable for executing the computing code include a single computer with multiple processors, several networked computers, specialized hardware, or any combination of the aforementioned elements. Further to these embodiments, multi-processor environments include various architectures such as multi-core chips, clusters, field-programmable gate arrays (FPGAs), digital signal processing chips, and/or graphical processing units (GPUs). In these embodiments and to this end, the computing code is parallelized for execution in a multi-processor environment including any number or combination of the above listed architecture types. The instruction sets suitable for parallel execution are generated from the computing code that allows multiple threads of computing code to be executed concurrently by the various computing elements within the multi-processor environment.

Figure 2:
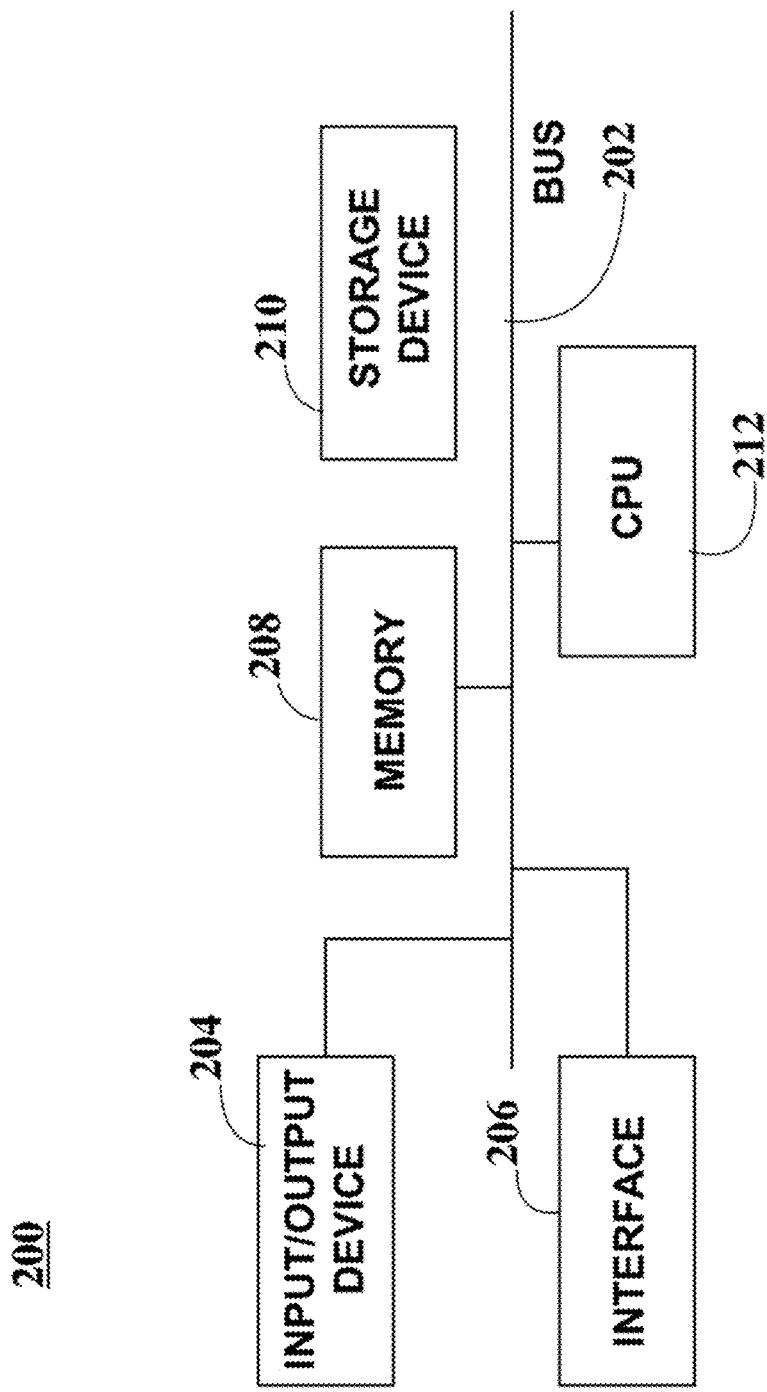
FIG. 2 is a block diagram illustrating example components within a computing device in which one or more embodiments of the present disclosure operate, according to an embodiment.

FIG. 2 is a block diagram illustrating example components within a computing device or server, such as the analytics engine, in which one or more embodiments of the present disclosure operate, according to an embodiment. In FIG. 2, computing device 200 includes bus 202, input/output (I/O) device 204, communication interface 206, memory 208, storage device 210 and central processing unit 212. In other embodiments, computing device 200 includes additional, fewer, different, or differently arranged components than those illustrated in FIG. 2.

In FIG. 2, bus 202 is physical coupled to and in electrical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanisms that may enable an examiner or candidate to input information to computing device 200, including a keyboard, computer mice, buttons, touch screens, touch-pad, voice recognition, biometric mechanisms, and the like. (I/O) device 204 also includes a mechanism that outputs information to the examiner or candidate using computing device 200, such as, a display, a microphone, a light emitting diode (LED), a printer, a speaker, orientation sensors, and the like.

Examples of communication interface 206 include mechanisms that enable computing device 200 to communicate with other computing devices and/or systems through network connections. Examples of memory 208 include random access memory 208 (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, client computing devices 102, or other components of system architecture 100. Examples of these implementations include servers, authorized computing devices, smartphones, desktop computers, laptop computers, tablet computers, PDAs, another type of processor-controlled device that receives, processes, transmits digital data, and the like. Additionally, computing device 200 performs certain operations that are required for the proper operation of the systems and methods described herein. Suitable computing devices 200 perform these operations in response to central processing unit 212 executing software instructions contained in a computer-readable medium, such as memory 208.

In one embodiment, the software instructions of the system are read into memory 208 from another memory location, such as storage device 210, or from another computing device 200 (e.g., client computing devices 102) via communication interface 206. In this embodiment, the software instructions contained within memory 208 instruct central processing unit 212 to perform processes that will be described in FIGS. 3-13, below.

Figure 3:
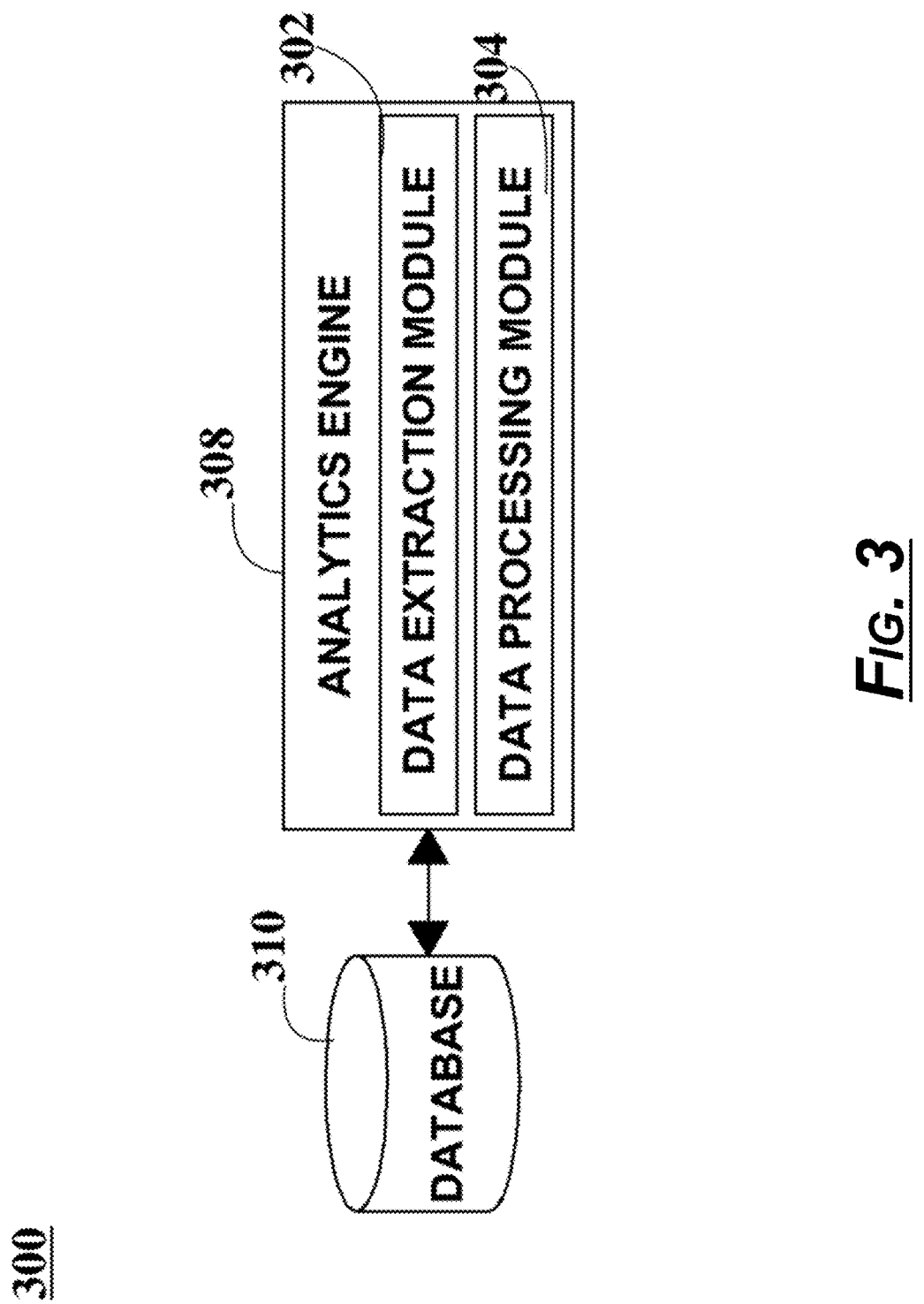
FIG. 3 illustrates an exemplary subsystem of an analytics engine within a system configured to implement an electronic problem solving board, according to an embodiment.

FIG. 3 is a block diagram illustrating an exemplary subsystem of an analytics engine server within a system configured to implement an electronic problem solving board, according to an embodiment. In FIG. 3, sub-system 300 includes database 310 and analytics engine server 308. Analytics engine 308 further includes data extraction module 302 and data processing module 304. Although sub-system 300 includes the listed components, it should be understood that sub-system 300 can include less components, more components, or different components depending on the desired analysis goals.

Analytics engine 308 is operatively coupled to and in bi-directional communication with database 310. In an example and referring to FIG. 1, analytics engine 308 functions in a substantially similar manner as analytics engine 108 within system architecture 100 of FIG. 1. Continuing the example, database 310 functions in a substantially similar manner as database 110 within system architecture 100 of FIG. 1.

Analytics engine 308 is configured to receive user input from client computing devices 102, receive company data from database 310, produce solution data based on the received user input and company data, and provide the produced solution data to a user through a client computing device. The analytics engine server 308 can contain one or more modules stored on a computer readable medium that when executed by a processor are configured to carry out particular functionality. In some embodiments, data extraction module 302 receives the user input from client computing devices, extracts problem data and/or user requests from said user input, and provides the problem data and/or user requests to data processing module 304. In these embodiments, data extraction module 302 retrieves company data from database 310. Further to these embodiments, data processing module 304 is configured to receive problem data and/or user requests and the company data from data extraction module 302, produce solution data from said problem data and company data, and provide said solution data to a user through a client computing device.

In some embodiments, data processing module 304 generates solution data using one or more predictive analytics algorithms. In these embodiments, predictive analytics algorithms include machine learning algorithms and collaborative filtering algorithms. Examples of machine learning algorithms include, but are not limited to, robust regression, k-Nearest Neighbors, support vector regression, Gaussian process regression, and the like. Examples of collaborative filtering algorithms include, but are not limited to, nearest neighbor mechanism, shilling attacks, Bayesian networks, clustering models, Pearson correlation, hybrid collaborative filtering algorithm approaches, and the like.

In exemplary operation, data extraction module 302 receives problem data and/or user requests. In this example, the problem data includes a problem involving a single department. Further to this example, the user defines that the eight wastes identification methodology can be implemented for addressing the problem. In this example, data extraction module 302 receives the problem data as well as a user request for solution data associated with the provided problem data. Further to this example, data extraction module 302 feeds the problem data into data processing module 304. In this example, data processing module 304 employs one or more predictive analytics algorithms and classifies the problem as a problem of low complexity. Further to this example, data extraction module 302 retrieves company data, such as, for example a set of one or more available employees and provides the company data to data processing module 304. Based on the problem complexity and the available employees, data processing module 304 employs collaborative filtering algorithms for assigning two employees that have had an excellent performance track record addressing substantially similar problems in the past. Further to this example, data processing module 304 uses the problem complexity, the problem description, and the recommended employee assignments to produce and then provide a set of suggestions for resolving the problem under analysis (using collaborative filtering algorithm for providing said suggestions). All of this information is contained within the solution data. Next, data processing module 304 provides the solution data to the user through client computing devices. Then, data processing module 304 stores the solution data at database 310.

FIG. 4 illustrates a data model for structuring problem data, according to an embodiment. In FIG. 4, diagram 400 includes problem name 402, number of departments and parties involved 404, problem solving tools 406, and problem description 408.

The problem name 402 is a field displaying the name of the problem identified. Examples of problem names include, but are not limited to, "problem in customer service," "break in process," "delay in process," "department not achieving its targets," and the like.

The number of departments and parties involved 404 is a field indicating the departments and/or parties affected by the problem. Examples of affected departments include human resources, finance, marketing, sales, risk management, underwriting, and the like. Examples of parties include individuals, groups of individuals not formally associated with a specific organizational department, and the like.

The problem solving tools 406 is a field listing lean management tools currently or previously employed for addressing a problem. Examples of problem solving tools include five whys technique, fish bone diagrams, eight wastes identification methodology, and the like.

The problem description 406 is a field where a user can describe the problem he/she is experiencing in plain language. In an example, a problem description associated with a problem in the sales department might describe low forecasting accuracy. In this example, a forecasting error below 5 percent is preferred. Further to this example, the current forecasting error is 12 percent.

FIG. 5 illustrates a data model for structuring problem data, according to an embodiment. In FIG. 5, diagram 500 includes problem name 502, complexity 504, assigned employees 506, and suggestions 508.

The problem name 502 is a field displaying the name of the problem identified. Examples of problem names include, but are not limited to, "problem in customer service," "break in process," "delay in process," "department not achieving its targets," and the like. In some embodiments, the problem name was provided by the user with the associated problem data.

The complexity 504 is a field displaying the level of difficulty of the identified problem. In these embodiments, the categories for classifying the complexity of a problem include low, medium, high, and the like. Further to these embodiments, the complexity of a problem is defined by the analytical engine based on the associated problem data. Alternatively, classification can be based upon how much is known about a cause of the problem, e.g., the cause is known, the cause might be known, and the cause is unknown.

The assigned employees 506 is a field defining the suggested employees to be involved in the resolution of a problem. In some embodiments, the assignment of employees to a problem depends on the problem complexity, employee availability, and previous performance of employees with similar problems.

The suggestions 508 is a field listing the set of recommendations for addressing a problem. In some embodiments, said recommendations are suggested based on the problem description and the problem complexity. In these embodiments, said recommendations include reports filed by employees describing solutions to past problems that are substantially similar to the current problem.

FIG. 6 illustrates a problem resolution progress report, according to an embodiment. In FIG. 6, diagram 600 includes one or more fields illustrating information associated with a problem. In FIG. 6, diagram 600 includes problem name 602, problem status 604, identified date 606, date completed 608, problem complexity 610 and key performance indicators (KPIs) 612.

In some embodiments, problem name 602 is a field displaying the name of the problem identified. Examples of problem names include, but are not limited to, "problem in customer service", "break in process", "delay in process", "Department not achieving its targets", and the like.

In some embodiments, problem status 604 lists statuses associated with the problems included in the electronic problem solving board. In these embodiments, the set of statuses includes, but is not limited to, identified, learn, plan, do, check, adjust, completed, on hold and closed. In other embodiments, each status has an associated date for tracking the development of the problem resolution over time. In these embodiments, the electronic problem board includes visual alerts for those problems which dates are past due.

In some embodiments, identified date 606 defines the date a problem was identified and entered into the electronic problem system. In some embodiments, date completed 608 offers information regarding the date the problem was completed.

In one embodiment, problem complexity 610 describes the difficulty of a problem. In this embodiment, the categories for classifying the complexity of a problem include low, medium, high, and the like. In some embodiments, the complexity of a problem is determined based on the number of employees recommended to work on a problem, the number of department and parties involved, the tools employed for addressing the problem, and the like. In other embodiments, problem complexity is assigned based on the use of one or more countermeasures to a problem that are determined using qualitative based techniques such as the Harvey Ball process.

In some embodiments, KPIs 612 are the base line benchmarks against which problems are compared to verify if a prospective problem is a problem and to further establish a goal for the solution of each problem. In these embodiments, processes below a certain KPI score are identified as problems with opportunities of improvement. Further to these embodiments, problems are closed when they accomplish a performance level over certain KPI score. Examples of KPIs include measures in the space of employee development, product and service quality, timeliness of transactions with customers, cost, business growth, and the like.

Figure 7:
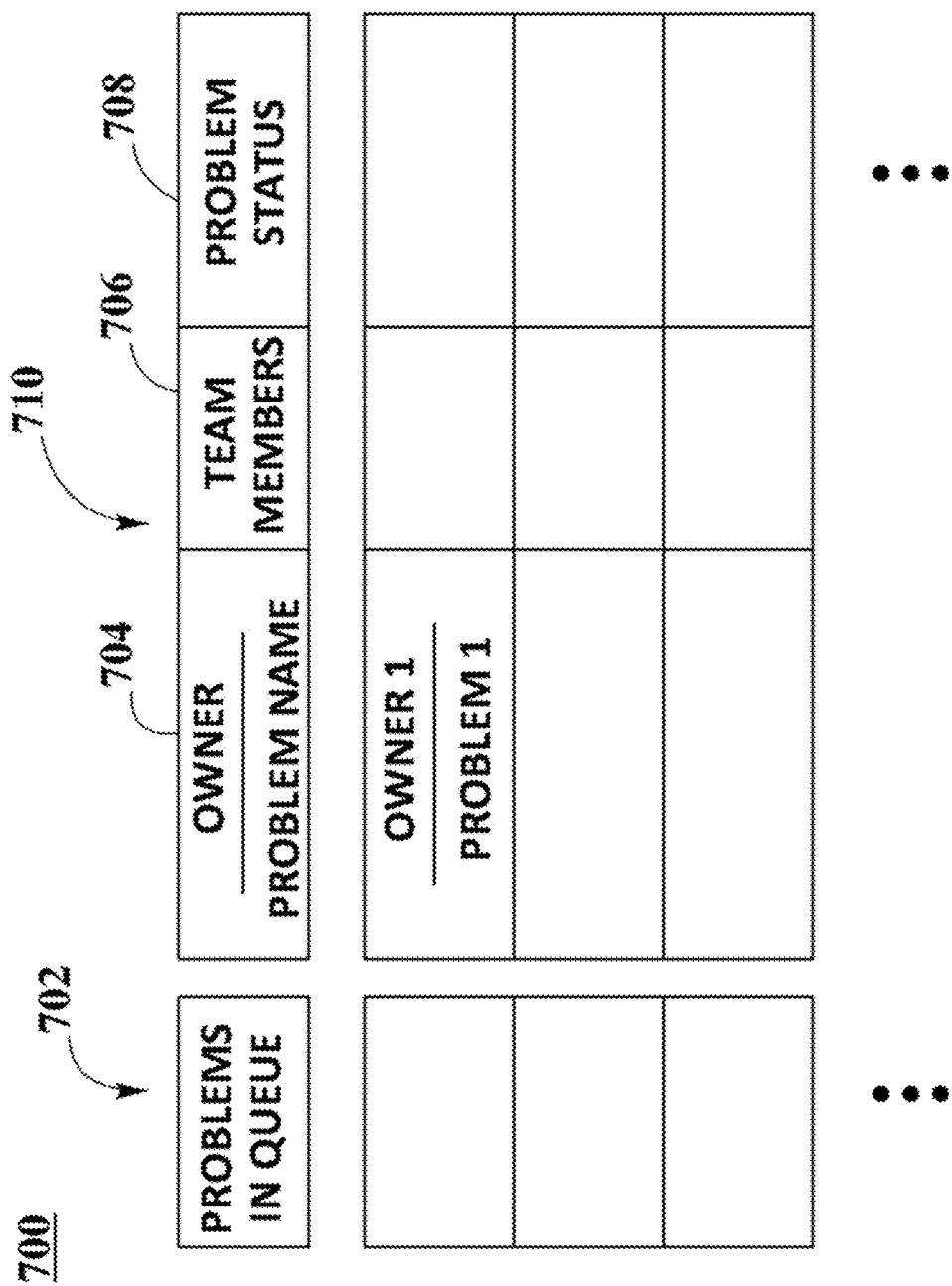
FIG. 7 illustrates a problem resolution progress report, according to another embodiment.

FIG. 7 illustrates a problem resolution progress report, according to another embodiment. In FIG. 7, diagram 700 includes active problems 702 and problems in queue 710. Active problems 702 further includes owner/problem name 704, team members 706, and problem status 708.

Active problems 702 are problems currently being analyzed/solved. In these embodiments, problems in queue 710 includes additional problems waiting to be acted upon in the problem queue. Further to these embodiments, the problems in queue 710 are prioritized based on the positive impact to the company expected by solving the associated problem and the effort projected for solving said problem. Said prioritization includes different categories such as low, low medium, medium, medium high, high and the like. In some embodiments, as a problem within active problems 702 is solved/closed, the problem with the highest priority within problems in queue 710 is moved to active problems 702 for action.

Owner/problem name 704 defines the one or more team leaders in charge of solving a specific problem as well as the name of the specific problem.

Team 706 defines the immediate team working on a problem. In these embodiments, team 706 field includes additional solvers who help solve a problem. Said additional solvers include employees outside of the specific immediate team assigned to the problem. Further to these embodiments, an individual may have multiple roles on one team. In some embodiments, teams and solvers use color codes for identifying the complexity of the problems to which they are assigned. In some embodiments, multiple teams and/or additional solvers work on a single problem. In these embodiments, teams and additional solvers with multiple problems in the same status will be listed in multiple rows and individuals with problems in different statuses will be listed in one row. In one embodiment, one or more teams and one or more additional solvers may work on a single project from different geographic locations.

Problem status 708 lists statuses associated with the problems included in the electronic problem solving board. In these embodiments, the set of statuses includes, but is not limited to, identified, learn, plan, do, check, adjust, completed, on hold and closed. In other embodiments, each status has an associated date for tracking the development of the problem resolution over time. In these embodiments, the electronic problem board includes visual alerts for those problems which dates are past due.

The development of problems resolution can be tracked and continually updated. In these embodiments, the electronic problem solving board provides communication (e.g., sends an e-mail) to one or more individuals after performing an update.

Figure 15:
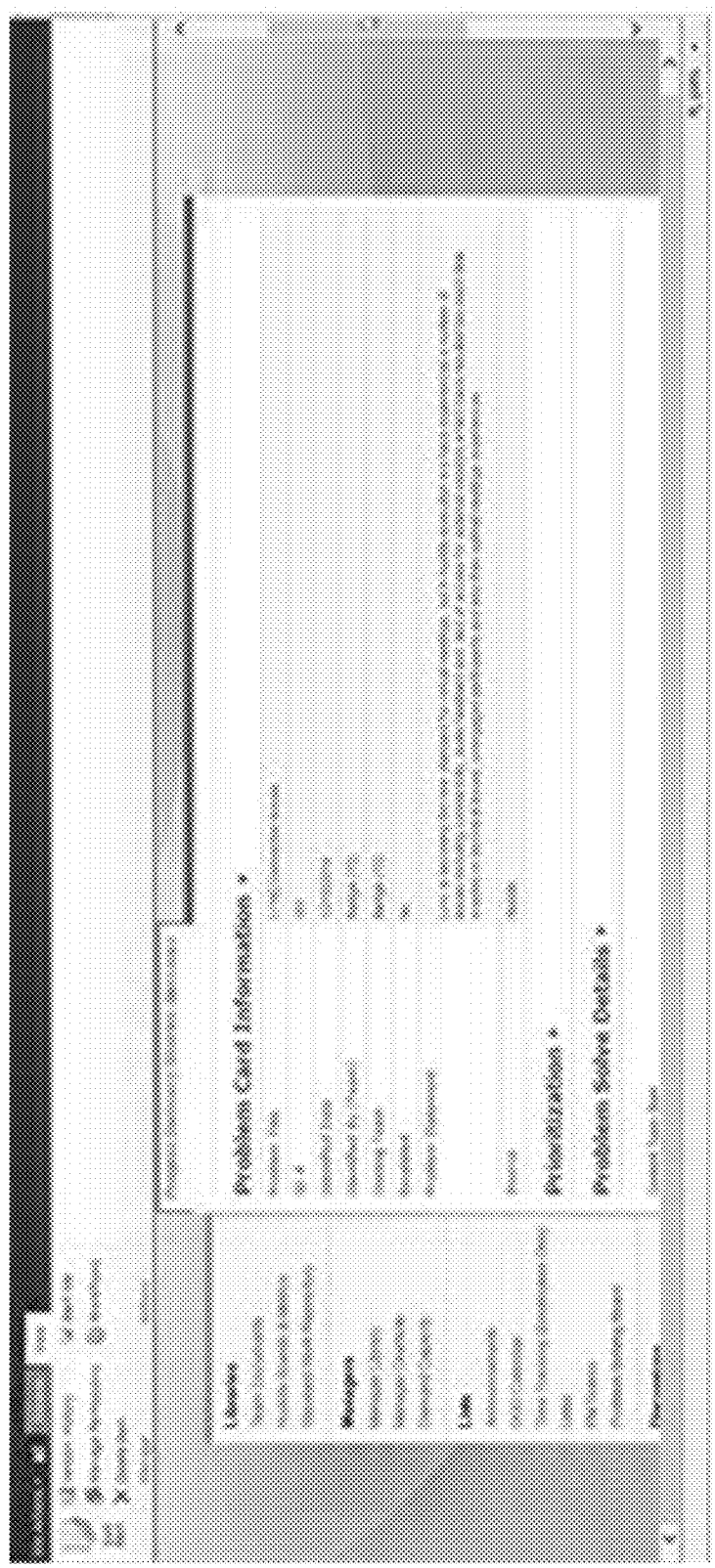
FIG. 15 is a user interface presenting additional problem information, according to an embodiment.
Figure 18:
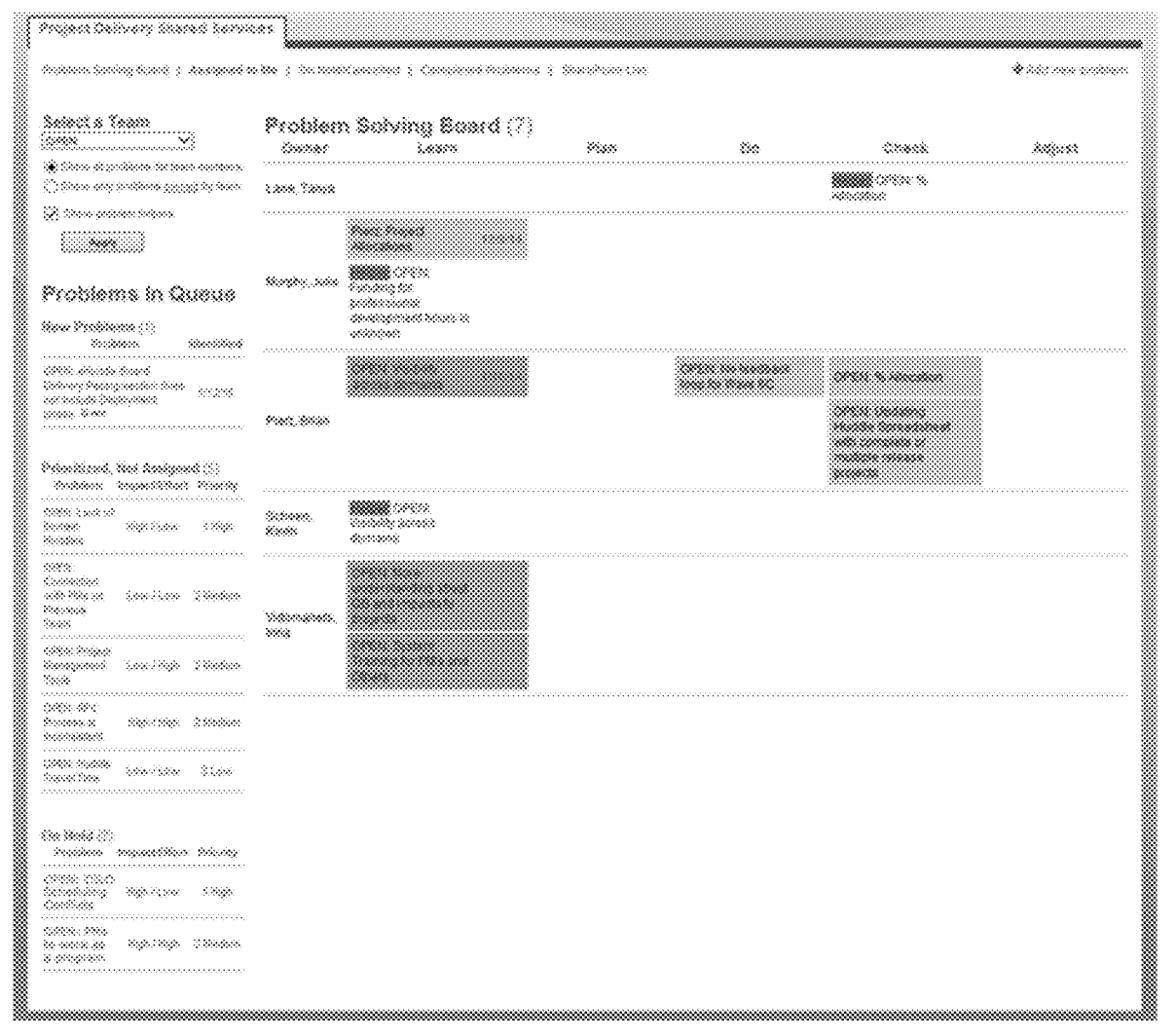

FIG. 18 illustrates a user interface presenting data from the database configured by the analytics engine server to illustrate problems in the queue along with a phase of the status of resolution/completion (e.g., learn, plan, do, check, adjust). The user interface also displays an owner of the problems in the data record. Each problem on the user interface has a link that can be activated to generate a new user interface that presents more detailed information about that problem, as shown in FIG. 15.

FIG. 8 illustrates key performance indicators (KPIs) reports, according to an embodiment. A KPI may impact cost, growth, human development, quality, timeliness, or the like. Diagram 800 includes information associated with identified problems such as opportunity 802, description 804, first KPI measure 806, second KPI measure 808 and total benefits 810.

Opportunity 802 is a field displaying opportunities for improvement in a process. For example, opportunities in reduction of total customer waiting time. In this example, total customer waiting time refers to the time a customer waits, on average, before receiving a service. In these embodiments, processes below certain KPI scores are identified as problems with opportunities for improvement. Further to these embodiments, problems are closed when they meet a performance level exceeding a certain KPI score.

Description 804 is a field that provides a brief description of the different opportunities for improvement that have been identified. Examples of descriptions of the different opportunities for improvement include "current customer waiting time is exceeding one hour, efficiencies may be derived with a modification of customer service operations"

First KPI measure 806 refers to a current measure associated with a process, such as, for example in which there are opportunities for improvement. In these embodiments, problem data regarding one or more KPIs are imported from third party software. In another embodiment, first KPI measure 806 refers to a previous measure taken of a process before applying any countermeasure. In an example, first KPI measure 806 refers to a previous KPI measure taken of a process before applying any countermeasure and is included within the problem data to be compared to the key performance indicator (KPI) benchmark.

Second KPI measure 808 refers to a target performance for a process. In other embodiments, second KPI measure 808 refers to a current measure taken of a process after applying one or more countermeasures. In these embodiments, problems are closed when they accomplish a performance level greater than a certain KPI target score.

Total benefits 810 measures the impact that one or more countermeasures had on a process. Total benefits 810 can be measured in terms of hours saved, problems avoided, and/or a monetary value saved by hours saved or problems avoided. In these embodiments, total benefits 810 involve one or more arithmetic calculations. Further to these embodiments, total benefits 810 are represented in real number values or in percentages.

In an example, the customer service satisfaction score is measured on a scale from 1.0 to 5.0, where scores close to 5 represent high customer satisfaction and scores close to 1.0 represents low customer satisfaction. Additionally, a customer satisfaction score equal to 4.0 or higher is preferred. In this example, the first KPI measure 806 of customer satisfaction is 2.0. Some opportunities for improvement were identified in the manner in which employees built empathy and rapport with the clients. After providing the employees with feedback and proper training, a second KPI measure was taken. In this example, second KPI measure 808 of customer satisfaction was 4.8. Further to this example, total benefits 810 were then calculated to be 2.8.

Figure 17A:
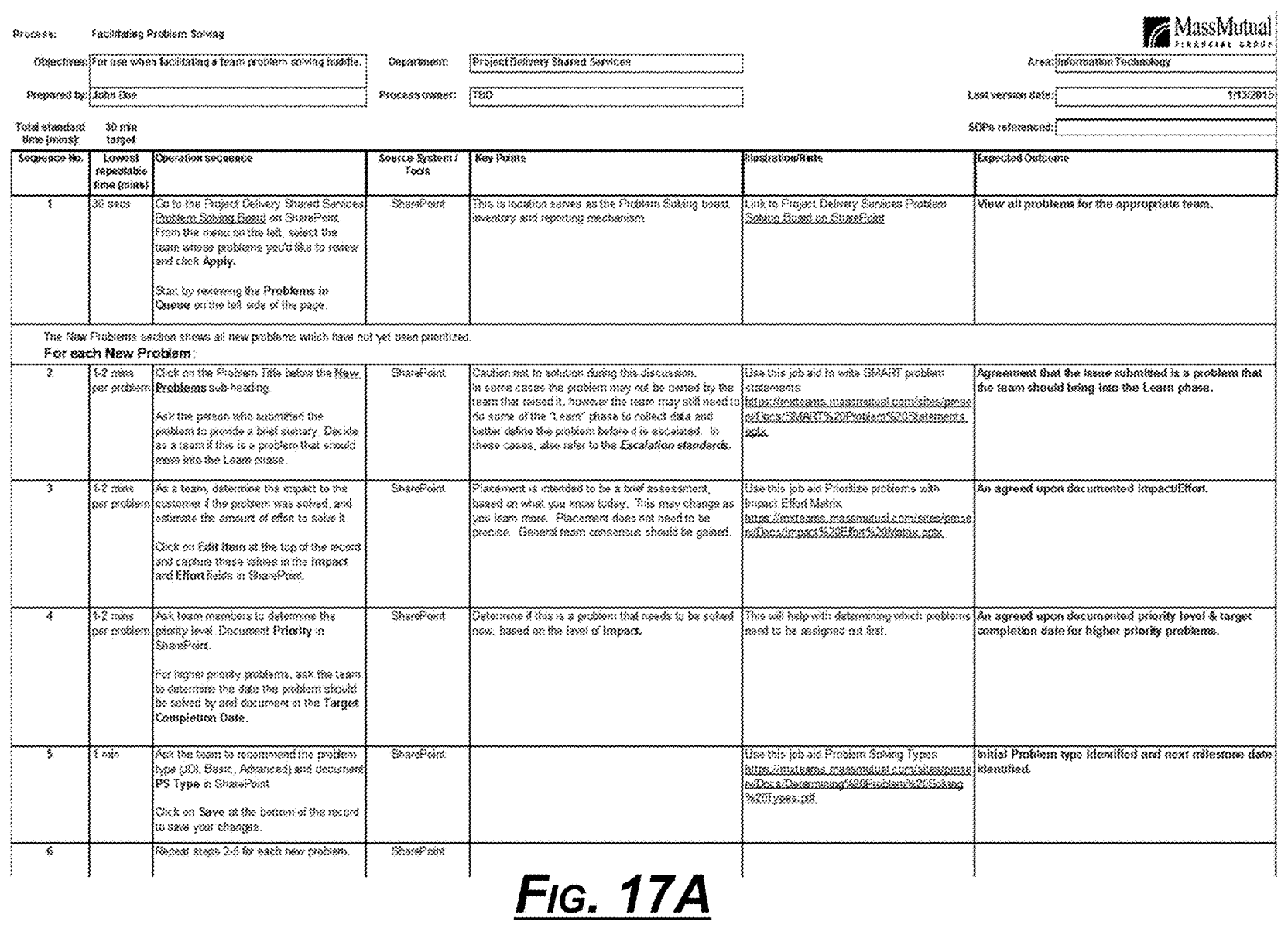
Figure 17B:
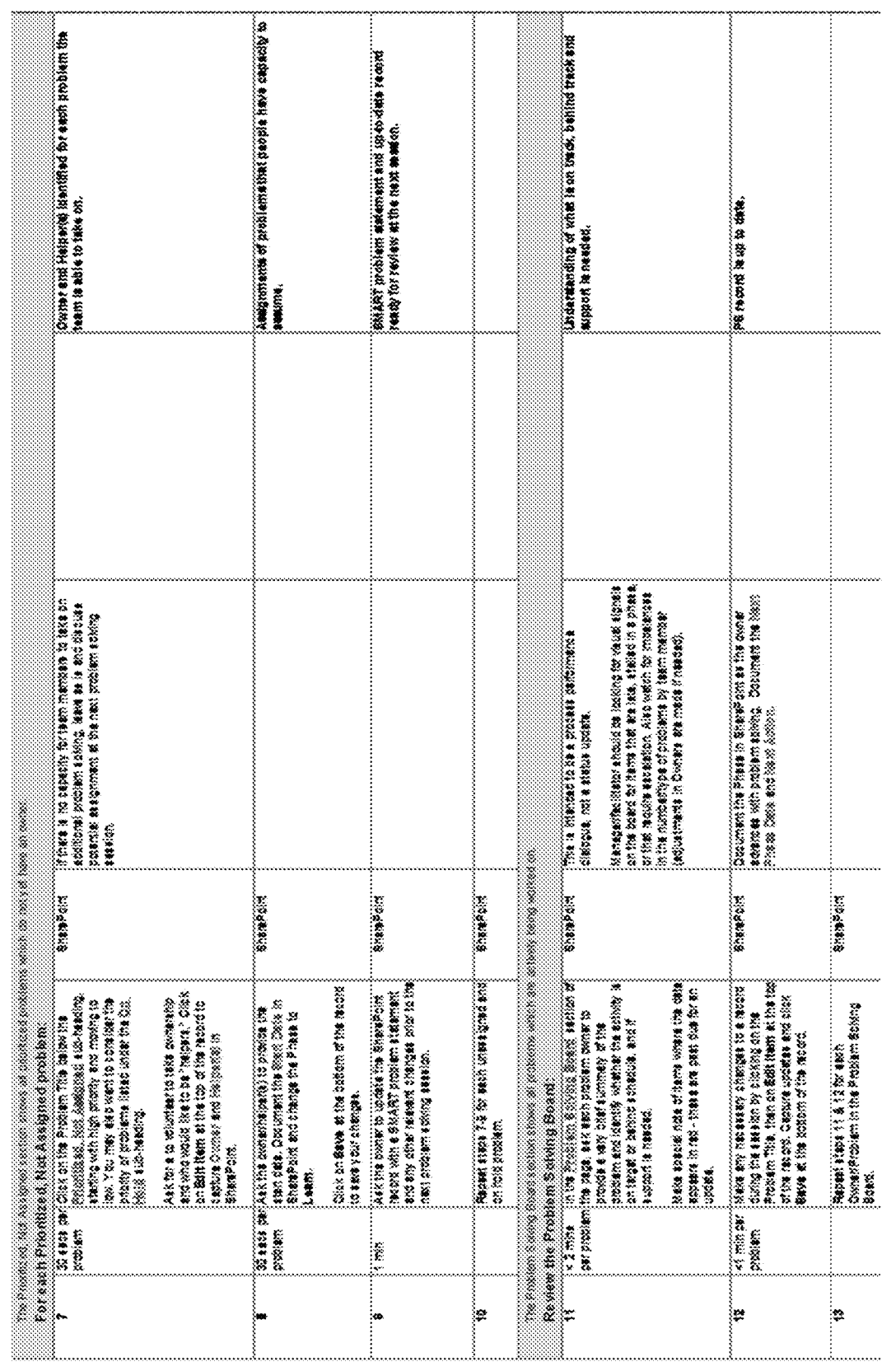
Figure 17C:
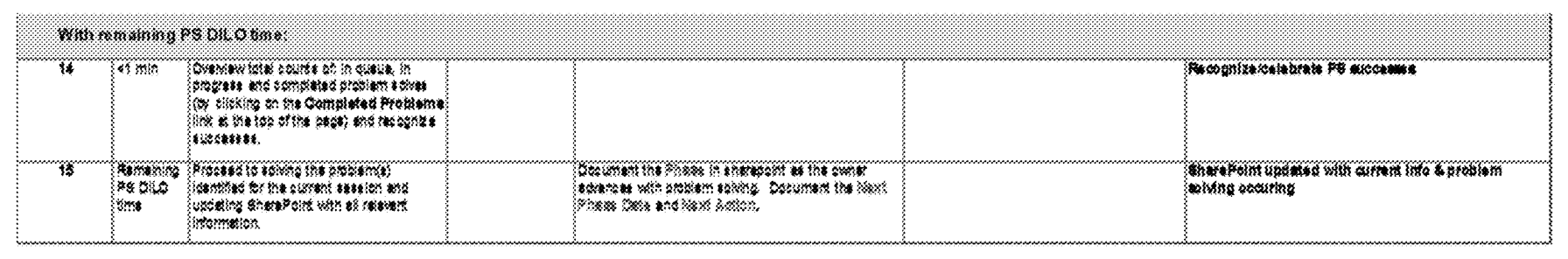

Referring to FIGS. 17A to 17C, instructions for a user interface is shown that identifies various steps, assumptions, and estimated time for completion of each step. The user interface comprises an operation sequence, a time (shown in seconds or minutes in this exemplary embodiment) for completion of the operation sequence, a source system or tool, key points for executing the operation sequence, any illustration or hints, and an expected outcome for the operation sequence. The user interface can also be used to show new problems (e.g., problems that have a recently generated data record), problems not assigned, and problems that are prioritized. When data record associated with a problem contains an indication of a particular operation sequence, the analytics engine can determine the status of problem assessment, future steps to resolve the problem, and how long each remaining operation sequence should take. Upon determining a current operation sequence, the analytics engine can also calculate a remaining estimated time to problem resolution or a total time for problem resolution. The time can be updated dynamically, such as an indication of a shorter or longer time required for completion of an operation sequence. For example, if an operation sequence is completed faster than the estimated time, then the analytics engine can update the time estimate to account for the quicker completion. In another example, if an operation sequence is not handled by a deadline, the analytics engine can automatically extend a completion time for the operation sequence as well as the total estimated time.

According to some embodiments, the electronic problem solving board includes reporting capabilities which enable users to generate detailed and rolled up reports regarding pending and completed problem KPIs. In these embodiments, pending problems assigned to a team and/or an additional solver are included in the report. Additionally, reports regarding completed problems are broken down by timeframe and by teams (or by additional solvers). Further to these embodiments, the reports are exported to third party software solutions for further analysis.

In an example, a user exports a report regarding all pending and completed problems during the last two months. In this example, the agent filters all pending and completed problems related to one team using filters provided by a third party software.

A plurality of methods implemented by analytics engine 308, of FIG. 3 above, are performed by one or more computing devices such as computing device 200, of FIG. 2. The methods are implemented with components of the exemplary operating environments of FIGS. 1-3. The steps of this exemplary method are embodied in a computer readable medium containing computer readable code such that the steps are implemented when the computer readable code is executed by a computing device. While the steps in the disclosed process are shown in a particular order, the actual order may differ. In some embodiments, some steps are performed in parallel.

Figure 9:
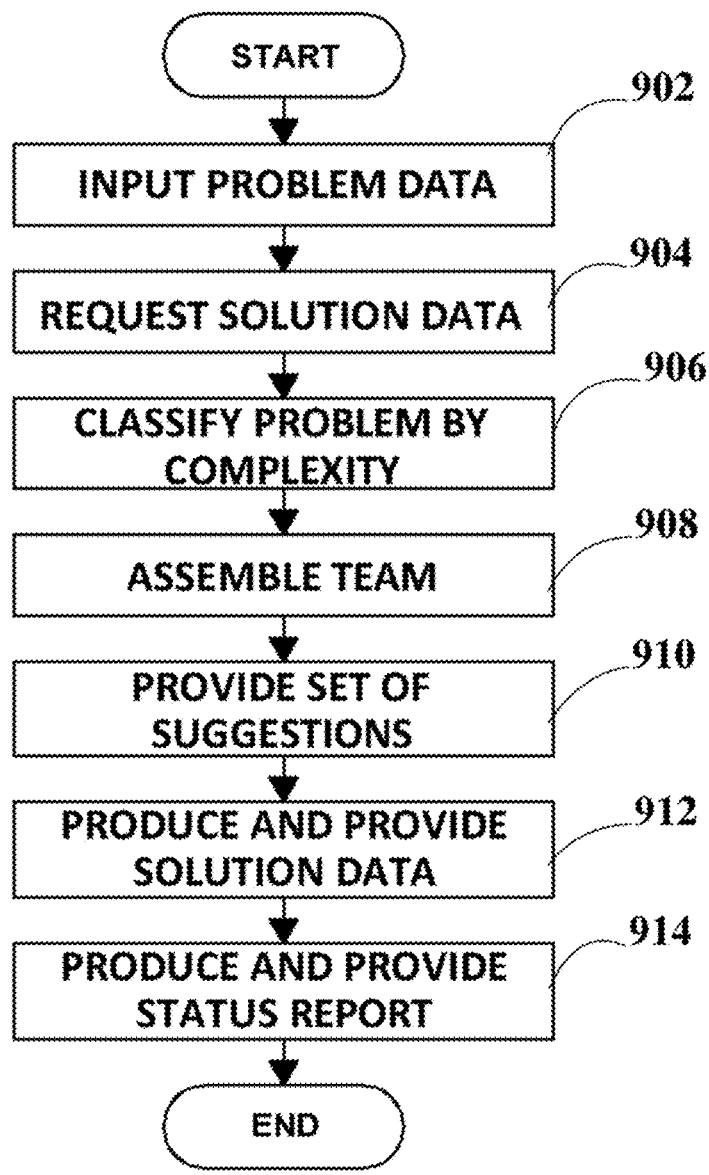
FIG. 9 is a flow chart of a method for problem classification and problem management, according to an embodiment.

FIG. 9 is a flow chart of a method for automated problem classification and problem management, according to an embodiment. In FIG. 9, method 900 includes a plurality of steps that may be performed by one or more computing devices, such as, computing device 200 of FIG. 2 implementing/running one or more software modules/processes of the exemplary operating environments of FIGS. 1 and 3-8. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

The process begins at step 902, where a client computing device allows one or more users to provide user input. In one embodiment, user input includes problem data and user requests. In these embodiment, problem data includes a set of one or more characteristics related to an identified problem, such as, for example problem name/opportunity, problem identification number, problem description, number of departments and parties associated with a problem, problem solving tools currently or previously employed for addressing the problem, key performance indicator (KPI) benchmark, date problem identified, and the like. Further to these embodiments, user requests include requests for solution data as well as status reports. Method 900 then advances to step 904.

At step 904, the user requests, through a computing device, solution data. The request is input into a user interface. The request may comprise a query for problems that are similar to the identified problem so that the user can ascertain how the other problems have been resolved or approached. Method 900 then advances to step 906. In other embodiments, the user requests, through a computing device, one or more status reports.

At step 906, the analytics engine classifies the problem under analysis by using one or more predictive analytics algorithms. In some embodiments, said problem classification step is performed by the data processing module within the analytics engine. In these embodiments, the problem is classified based on its complexity. This step is further described in FIGS. 10 and 11, below. Method 900 then advances to step 908.

At step 908, the analytics engine virtually assembles a team of available individuals suitable for addressing the problem under analysis. In some embodiments, said team assembly step is performed by the data processing module within the analytics engine. In these embodiments, the data processing module employs one or more collaborative filtering algorithms for suggesting said virtual team to be included within a workgroup. Further to these embodiments, the analytics engine employs demand and capacity balancing techniques for planning purposes. This step is further described in FIG. 12, below. Method 900 then advances to step 910.

At step 910, the analytics engine produces a set of problem resolution suggestions depending on the problem complexity and the problem description of the problem under analysis. In some embodiments, said problem resolution suggestions are produced by the data processing module within the analytics engine. In these embodiments, the data processing module employs one or more collaborative filtering algorithms for providing one or more problem resolution suggestions to address a problem. Further to these embodiments, the data processing module allows individuals assigned to work on a problem to have access to best practices implemented when addressing similar problems by using meta-data tags associated with similar problems that have been solved in the past. This step is further described in FIG. 13. Method 900 then advances to step 912.

At step 912, the analytics engine produces and provides solution data to the user via a client computing device. In some embodiments, the analytics engine produces solution data based on problem data and company data. In these embodiments, solution data includes problem name/opportunity, problem classification based on complexity, workgroup members, problem resolution suggestions, key performance indicator (KPI) benchmarks, KPI measures, problem owner, and the like.

At step 914, analytics engine produces and provides one or more status reports to the user. In some embodiments, status reports are produced by the analytics engine using problem data and solution data. In these embodiments, status report types include problem resolution progress reports (see FIGS. 6 and 7, above), Key performance indicators (KPIs) reports (see FIG. 8, above), and the like. Further to these embodiments, Status reports include one or more of the following data: problem name/opportunity, problem status, identified date, date completed, problem complexity, key performance indicators (KPIs), problems in queue, team members, problem owner, problem description, KPI measures, and total benefits.

Figure 10:
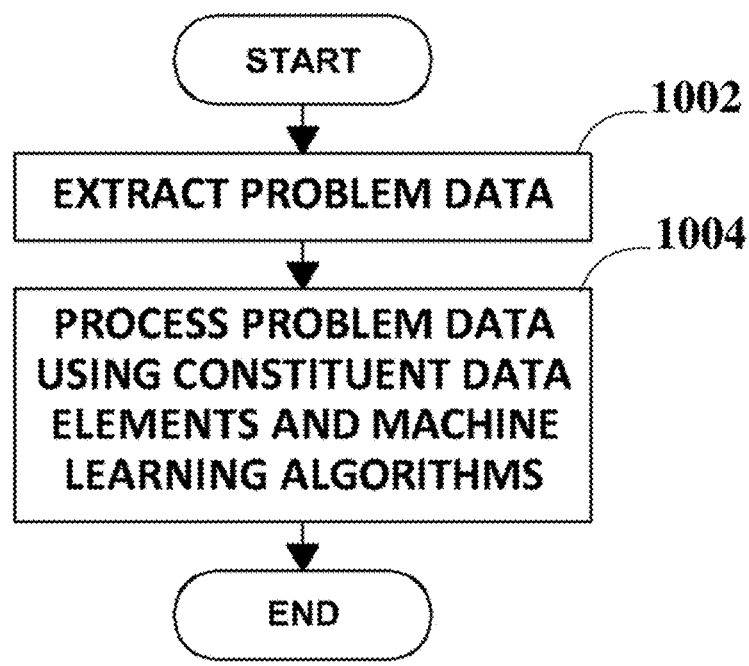
FIG. 10 is a flow chart of a method for automated problem classification, according to an embodiment.

FIG. 10 is a flow chart of a method for automated problem classification, according to an embodiment. In FIG. 10, method 1000 includes a plurality of steps that may be performed by one or more computing devices, such as, computing device 200 of FIG. 2 implementing/running one or more software modules/processes of the exemplary operating environments of FIGS. 1 and 3-8. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

The process begins at step 1002, where the analytics engine employs a data extraction module for extracting problem data from the received user input. In some embodiments, problem data includes a set of one or more characteristics related to an identified problem, such as, for example problem name/opportunity, problem identification number, problem description, number of departments and parties associated with a problem, problem solving tools currently or previously employed for addressing the problem, key performance indicator (KPI) benchmark, date problem identified, and the like. Method 1000 then advances to step 1004.

At step 1004, the analytics engine processes problem data using one or more machine learning algorithms. In some embodiments, processing the problem data allows the classification of the problem based on one or more of the constituent data elements contained within the problem data. In these embodiments, the one or more machine learning algorithms employs only a subset of the problem data. In these embodiments, machine learning algorithms include robust regression, k-Nearest Neighbors, support vector regression, Gaussian process regression, and the like. In this embodiment, said machine learning algorithms require a training phase employing a suitable sample size of data regarding problem classification. Further to these embodiments, said problem classification step is performed by the data processing module of the analytics engine. In these embodiments, the categories for classifying the complexity of a problem include low, medium, high, and the like. Method 1000 then advances to step 1006.

Figure 11:
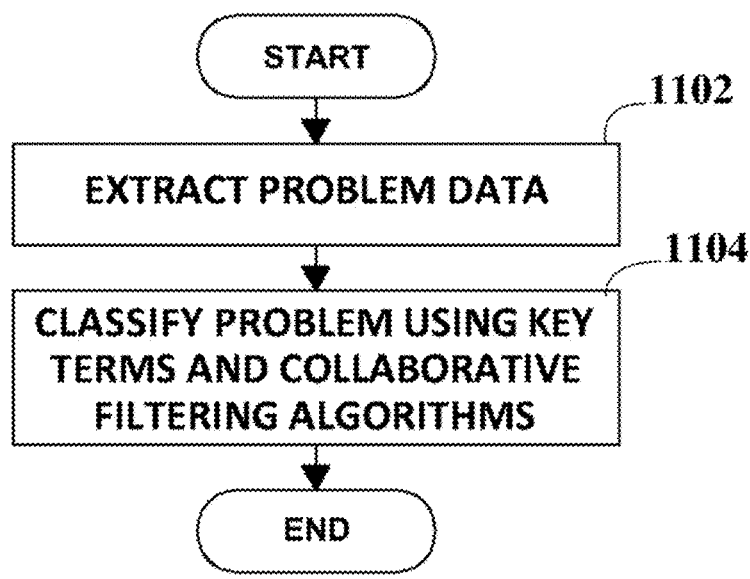
FIG. 11 is a flow chart of a method for automated problem classification, according to another embodiment.

FIG. 11 is a flow chart of a method for automated problem classification, according to another embodiment. In FIG. 11, method 1100 includes a plurality of steps that may be performed by one or more computing devices, such as, computing device 200 of FIG. 2 implementing/running one or more software modules/processes of the exemplary operating environments of FIGS. 1 and 3-8. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

The process begins at step 1102, where the analytics engine employs a data extraction module for extracting problem data from the received user input. In some embodiments, problem data includes a set of one or more characteristics related to an identified problem, such as, for example problem name/opportunity, problem identification number, problem description, number of departments and parties associated with a problem, problem solving tools currently or previously employed for addressing the problem, key performance indicator (KPI) benchmark, date problem identified, and the like. Method 1000 then advances to step 1104.

At step 1104, the analytics engine classifies the problem using one or more collaborative filtering algorithms. In some embodiments, said problem classification step is performed by the data processing module of the analytics engine. In some embodiments, key terms are derived for relating the current problem with previous problems. In these embodiments, said key terms are defined by one or more users examining one or more problem groups. Further to these embodiments, problem groups include those problems that are determined to be similar based on one or more characteristics. In some embodiments, the collaborative filtering algorithms employ problem data for establishing a similarity score among two or more problems that indicates the problems share a similar complexity. In some embodiments, the key terms are included within metadata associated with the current problems as well as with previous problems. In these embodiments, collaborative filtering algorithms include nearest neighbor mechanism, shilling attacks, Bayesian networks, clustering models, Pearson correlation, hybrid collaborative filtering algorithm approaches, and the like. Further to these embodiments, the categories for classifying the complexity of a problem include low, medium, high, and the like.

Figure 12:
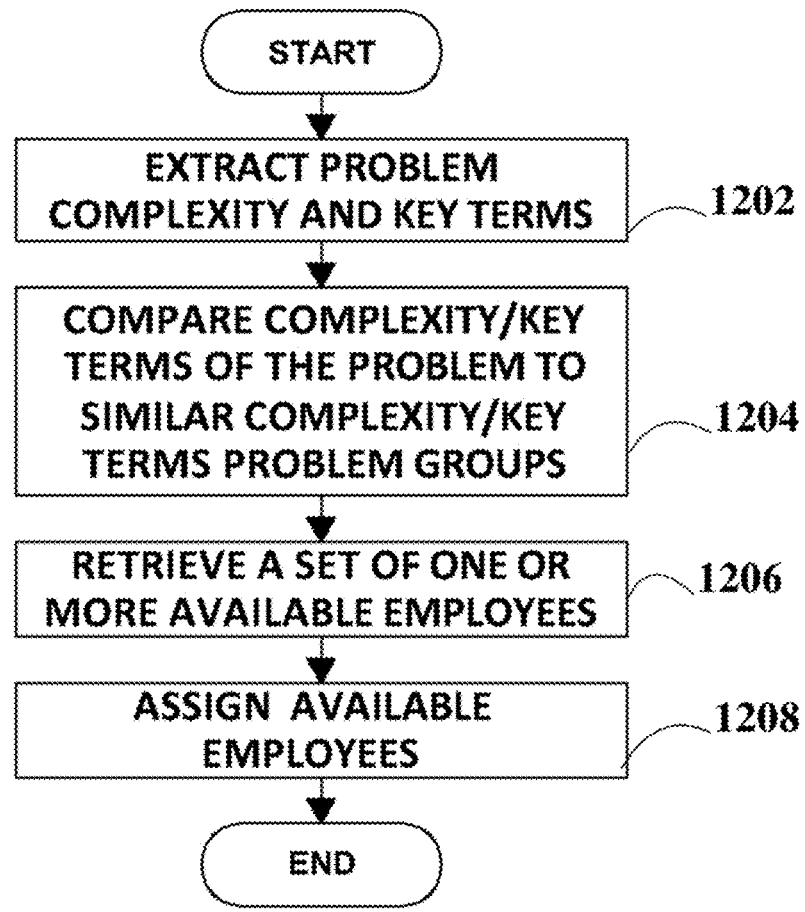
FIG. 12 is a flow chart of a method for employee assignment to an identified problem, according to an embodiment.

FIG. 12 is a flow chart of a method for employee assignment to an identified problem, according to an embodiment. Method 1200 includes a plurality of steps that may be performed by one or more computing devices, such as, computing device 200 of FIG. 2 implementing/running one or more software modules/processes of the exemplary operating environments of FIGS. 1 and 3-8. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

The process begins at step 1202, where the analytics engine retrieves the problem complexity associated with a problem as well as the key terms associated with the problem description from a database containing problem data and solution data. In some embodiments, the problem complexity/key terms retrieval step is performed by the data extraction module of the analytics engine. In some embodiments, the data extraction module provides the data processing module with the problem complexity/key terms of the problem under analysis. Method 1200 then advances to step 1204.

At step 1204, the data processing module compares complexity/key terms of the problem under analysis with problem groups having substantially similar complexity/key terms to determine a similarity score as well as employees associated with problem groups having a high similarity score. Method 1200 then advances to step 1206.

At step 1206, the analytics engine retrieves a set of one or more available employees from a database containing the company's data. The available employees can be presented on a user interface for a user. The listing of employees can be ranked according to one or more criteria or attributes, such as experience with the particular problem. In some embodiments, said retrieval step is performed by the data extraction module of the analytics engine. In some embodiments, the data extraction module provides the data processing module with the set of available employees. Method 1200 then advances to step 1208.

At step 1208, available employees associated with the problem groups having high similarity scores to the problem under analysis can be assigned to the problem. A user can view the user interface with the available employees and select which employees should be assigned to the problem or should be grouped as a team for working on the problem. In an alternative embodiment, said employee assignment step is performed by the data processing module of the analytics engine. In some embodiments, if there are not enough available employees associated with problem groups having high similarity scores, employees of the next closest problem groups are chosen.

Figure 13:
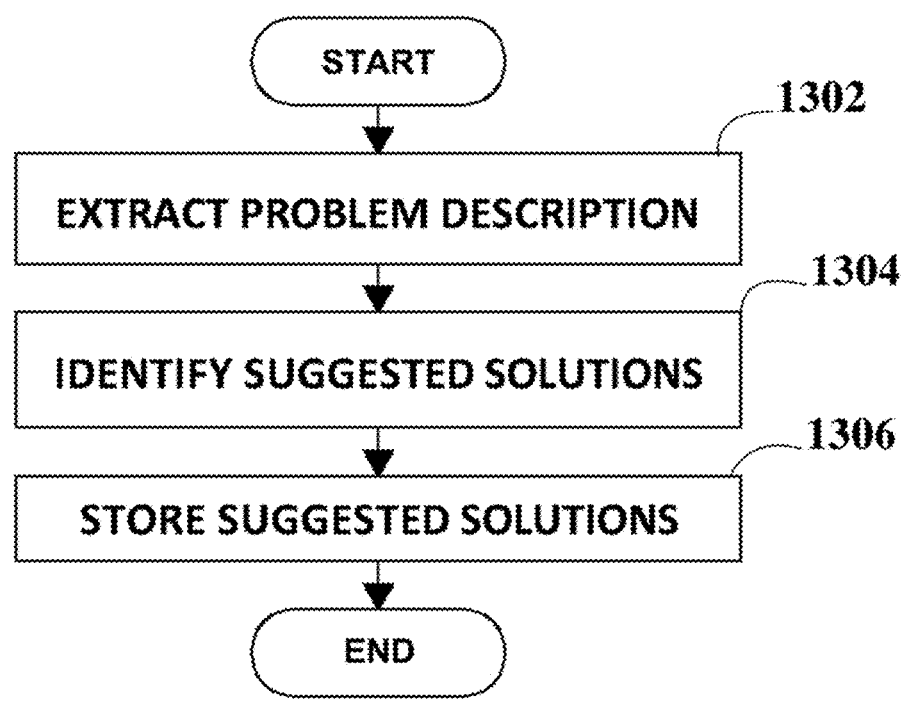
FIG. 13 is a flow chart of a method for problem suggestions, according to an embodiment.

FIG. 13 is a flow chart of a method for problem suggestions, according to an embodiment. Method 1300 includes a plurality of steps that may be performed by one or more computing devices, such as, computing device 200 of FIG. 2 implementing/running one or more software modules/processes of the exemplary operating environments of FIGS. 1 and 3-8. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

The process begins at step 1302, where the analytics engine extracts a problem description from the problem data contained within the user input, such as a query inputted into a user interface identifying the problem. The query can contain keywords and/or complexity, or the system can parse the problem to identify the keywords and complexity. In some embodiments, said problem description is extracted by the data extraction module of the analytics engine. In these embodiments, the data extraction module provides the problem description to the data processing module. Method 1300 then advances to step 1304.

At step 1304, the data processing module compares complexity/key terms of the problem data associated with the problem under analysis with problem groups having substantially similar complexity/key terms to identify suggested solutions. In some embodiments, the comparison determines a similarity score as well as suggestions for solving the problem associated with problem groups having a high similarity score. Method 1300 then advances to step 1306.

At step 1306, the analytics engine stores a set of suggested solutions at a database. In some embodiments, said suggested solutions stored at a database by the data processing module of the analytics engine. In one or more embodiments, employees assigned to a problem are allowed to enter to the system's database suggestions and effective countermeasures to a problem.

In some embodiments, the analytics engine employs demand and capacity balancing techniques for planning purposes such as problems due date determination, standard hours invested in a problem, problem scheduling, and the like. In an example, a company has 16 problems pending and 20 problems in queue. In this example, the standard hours required for completing said problems is 1,118 hours. Further to this example, the standard hours varies depending on the problem complexity. On the other hand, in a year each employee has 1589 hours available for working on said problems. Therefore an employee will work at 70% percent capacity for finishing all problems within a year. In that case the due date for solving all problems should be set to one year. However, the due date can be set earlier if more employees are assigned on the aforementioned problems.

In some embodiments, employees assigned to a problem are allowed to enter to the system's database suggestions and effective countermeasures to a problem. In other embodiments, the data processing module allows people assigned to work on a problem to have access to best practices implemented when addressing similar problems by using meta-data tags such as hashtags.

The database contains a data record of each problem. Each data record may include meta-data, such as a tag that includes one or more keywords associated with that problem. The meta-data tag can be inputted into the analytics engine, or the analytics engine can determine the keywords based on the identified problem. The analytic engine may also include keywords that are not present in the identified problem but are closely related to the identified problem or may be associated with the keywords in the meta-data tag. For example, if the problem is associated with resolving a computer error and the IT department has received a low customer satisfaction score based on resolving that error due to the time to resolution, then the data record can contain a tag in the meta-data that includes terms describing the computer error.

The meta-data in the data record can be updated automatically by the analytics engine. The analytics engine can add keywords to the meta-data upon the progress through operation sequences as a new keyword appears that may be useful as a tag and has not already been identified in the meta-data. For example, once a status is updated, an identification of a problem may cause the analytics engine to dynamically populate the meta-data with keywords based upon the identified cause of the problem.

Responsive to a query for a particular keyword, the analytics engine can generate a user interface that presents a listing of all problems that contain the keyword in the meta-data of the data record. The listing can be filtered to include only completed problems or only pending problems. In operation, the analytics server receives the query and searches the meta-data in each data record to determine which data records are tagged with that particular keyword. The analytics server then retrieves the stored problems in the data records and displays those problems on the user interface. When presenting the problems on the user interface, the analytics server can also provide an identification of a team, a team member, or a manager associated with the problem for contacting by the user.

When receiving a query for a keyword, the analytics engine can alternatively respond with proposed solutions for a problem having that keyword. Rather than presenting a user interface listing completed and/or pending problems, the user interface can additionally or alternatively present solutions to the user that have been recorded in data records having the keyword in the meta-data. In operation, the analytics server receives the query and searches the meta-data in each data record to determine which data records are tagged with that particular keyword. The analytics server then retrieves stored solutions for resolving the problems in the data records and displays those solutions on the user interface. The solutions can include a link that can be activated to retrieve additional information.

Figure 14:
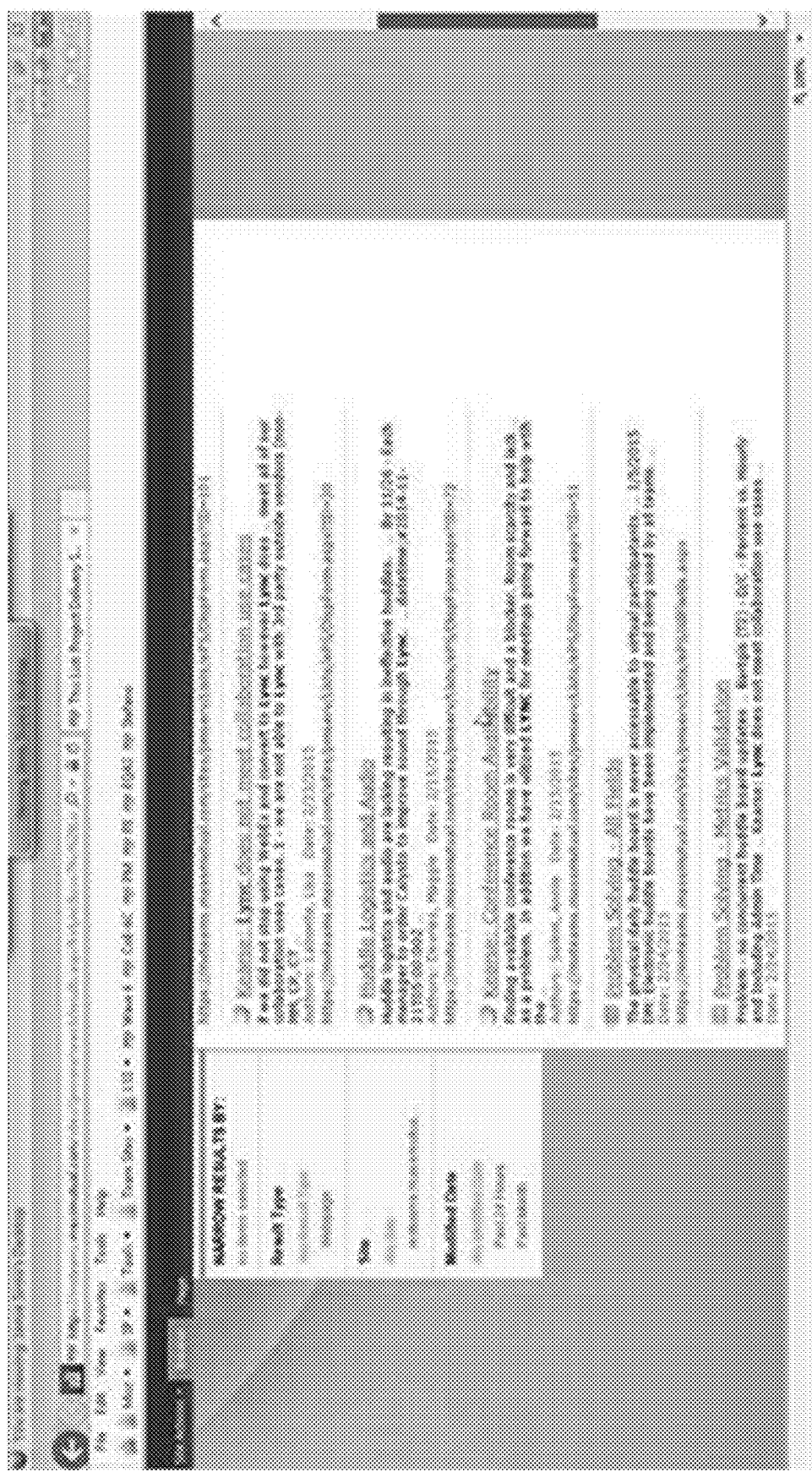
FIG. 14 is a user interface presenting results from a query of similar problems, according to an embodiment.

Referring to FIG. 14, an exemplary user interface shown on a web page is shown whereby a query of the analytics engine for similar problems results in the web page generated by the analytics engine server. The results are shown on the web page as a listing of data problems and information about the problems (e.g., a summary, date the data record was generated, status). A heading can have a link that can be activated on the user interface to instruct the analytics engine server to generate a new user interface (e.g., web page) that includes more detail about that particular problem, as shown in the exemplary user interface in FIG. 15.

Figure 16:
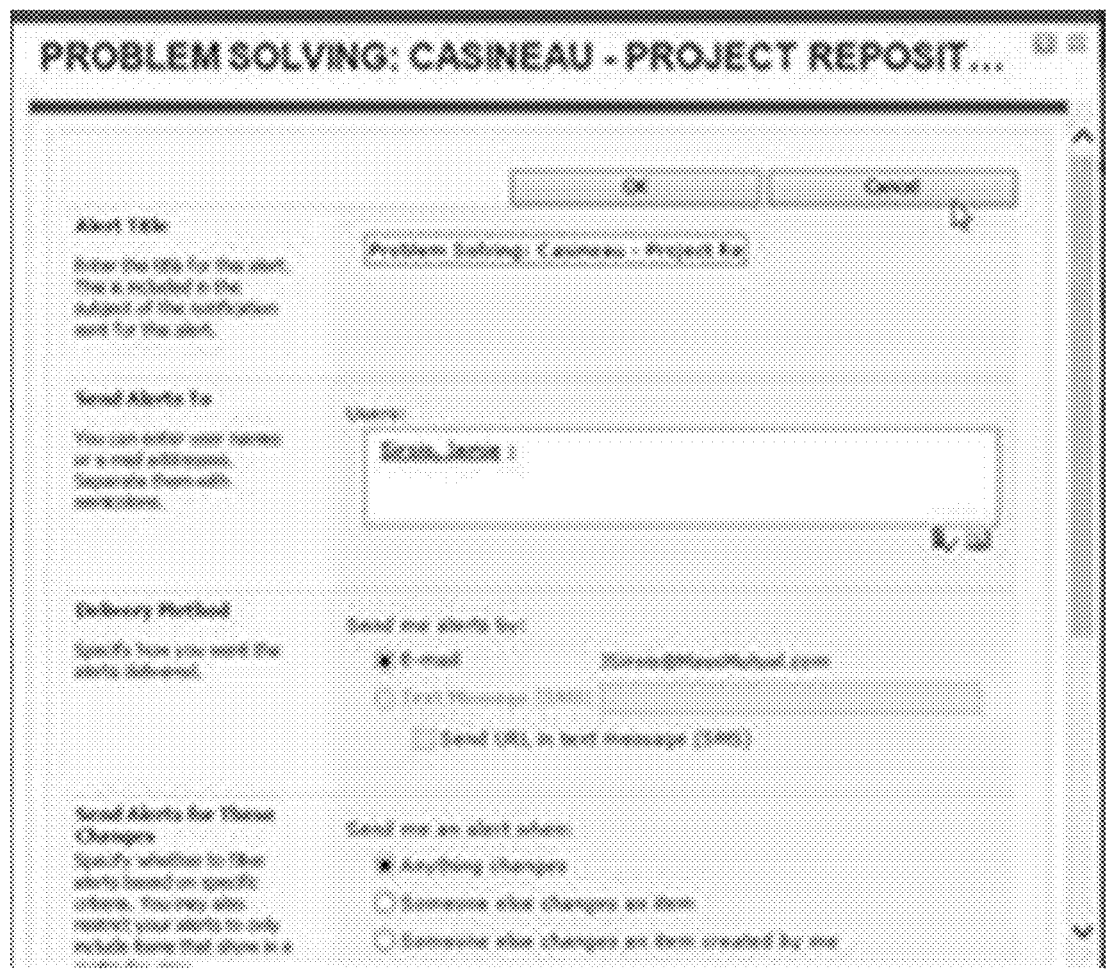
FIG. 16 is a user interface for configuring an alert, according to an embodiment.

In one embodiment, the user interface in FIG. 14 or the user interface shown in FIG. 15 can include a link that can be entitled "Alert Me," and the activation of that link can generate a trigger rule in one or more data records that an alert should be automatically generated and transmitted to the user computing device upon a change in the status or other change to the one or more data records. As shown in FIG. 16, a user interface is generated that presents options for selection by user computing device for configuring an alert, including how to title the alert, contact information for transmitting the alert, a delivery method (e.g., email message, text message, or URL in a text message), circumstances to send the alert (e.g., when anything changes, someone else changes an alert, or someone changes a setting), and how often to send an alert (not shown in FIG. 16).

The analytics engine can identify trends based on the keywords in the meta-data of the data records. A trend may show which problems are recurring, which problems are increasing in occurrences, and which problems are declining in occurrences. The analytics engine can generate a user interface containing a report of information showing the most popular keywords (e.g., top 100 most occurring keywords or top 100 most recent keywords). The user interface can also display a comparison to a previous listing of the most popular keywords, such as by showing a change in a ranking of a particular keyword or by showing which keywords have been added to or deleted from the listing of the most popular keywords.

The analytics engine can identify root causes of problems by determining how problems are linked. As each data record associated with each problem has meta-data containing a keyword, the analytics engine can determine which data records should be linked by containing the same or similar keywords. By identifying linked data records, a source of a common issue may be identified. The analytics engine may also be able to use the linked data records to present a user interface that displays a grouping of problems by a particular keyword.

In an exemplary method, an analytics engine server generates a new data record containing data representing a problem. The data record is stored in a database, and the database comprises data records each contain data representing problems, a status of a resolution of each of the problems, and metadata in each data record containing at least one keyword associated with the problem. The analytics engine server automatically generates a query of the metadata in the data records in the database that contain a keyword in the metadata of the data record representing a problem similar to the problem in the new data record, wherein the query is based upon metadata containing at least one keyword in the new data record. The analytics engine server generates a data file containing the data records that satisfy the query. The analytics engine server determines whether one of the data records in the data file that satisfies the query has a change in the status of the resolution. When there is a status change in one of those data records, the analytics engine server generates and transmits a graphical user interface configured for presentation on a display of a user computing device, the graphical user interface comprising a message containing data associated with the data record that has the change in the status of the resolution, wherein the data contains the problem and the status of the resolution.

In one embodiment, a computer-implemented method comprises generating, by an analytics engine server, a new data record containing data representing a problem, wherein the data record is stored in a database, and the database comprises data records containing data representing problems, a status of a resolution of each of the problems, and metadata in each data record containing at least one keyword associated with the problem; automatically generating, by the analytics engine server, a query of the metadata in the data records in the database that contain a keyword in the metadata of the data record representing a problem similar to the problem in the new data record, wherein the query is based upon metadata containing at least one keyword in the new data record; generating, by the analytics engine server, a data file containing the data records that satisfy the query; determining, by the analytics engine server, whether one of the data records in the data file that satisfies the query has a change in the status of the resolution; generating, by the analytics engine server, a graphical user interface configured for presentation on a display of a user computing device, the graphical user interface comprising a message containing data associated with the data record that has the change in the status of the resolution, wherein the data contains the problem and the status of the resolution.

In another embodiment, a system comprises a database comprising data records, wherein each data records contains data representing a problem, a status of a resolution of the problem, and metadata containing at least one keyword associated with the problem; an analytics engine server programmed to: generate a new data record containing data representing a new problem; provide instructions to store the new data record in a database; automatically generate a query of the metadata in the data records in the database that contain a keyword in the metadata of the data record representing a problem similar to the problem in the new data record, wherein the query is based upon metadata containing at least one keyword in the new data record; generate a data file containing the data records that satisfy the query; determine whether one of the data records in the data file that satisfies the query has a change in the status of the resolution; and generate a graphical user interface configured for presentation on a display of a user computing device, the graphical user interface comprising a message containing data associated with the data record that has the change in the status of the resolution, wherein the data contains the problem and the status of the resolution.

Figure 19A:

FIGS. 19A to 19E illustrate user interfaces, according to an embodiment. FIG. 19A is an example user interface that presents a user with a listing of the data records associated with problems where the user is assigned as an owner role and a listing of the data records associated with problems where the user is an assistant role.

Figure 19B:
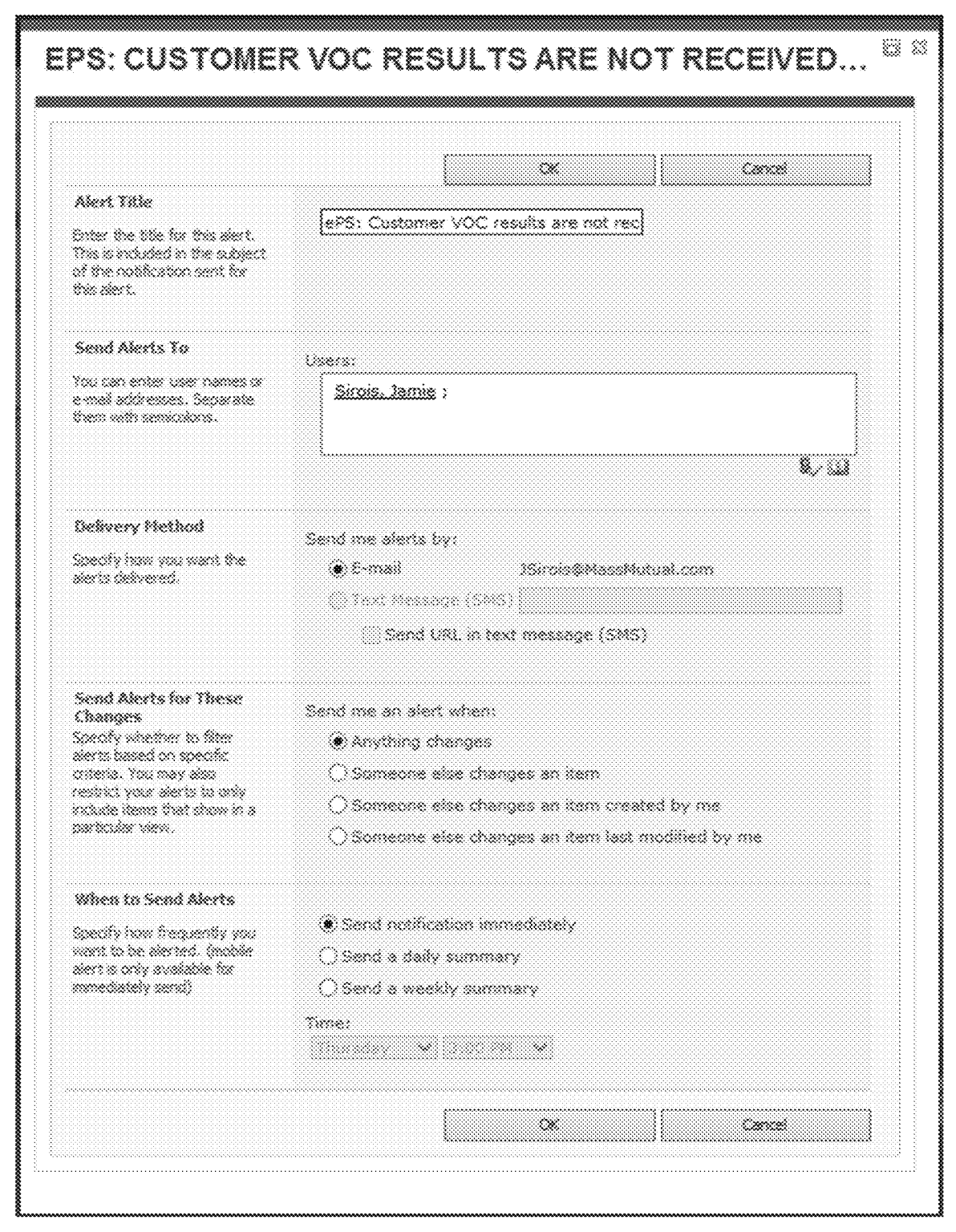

FIG. 19B is an example user interface that presents a profile page for a data record associated with a problem. The profile page contains criteria for causing the system to send alerts to a user, e.g., send an email immediately to the user when anything changes.

Figure 19C:
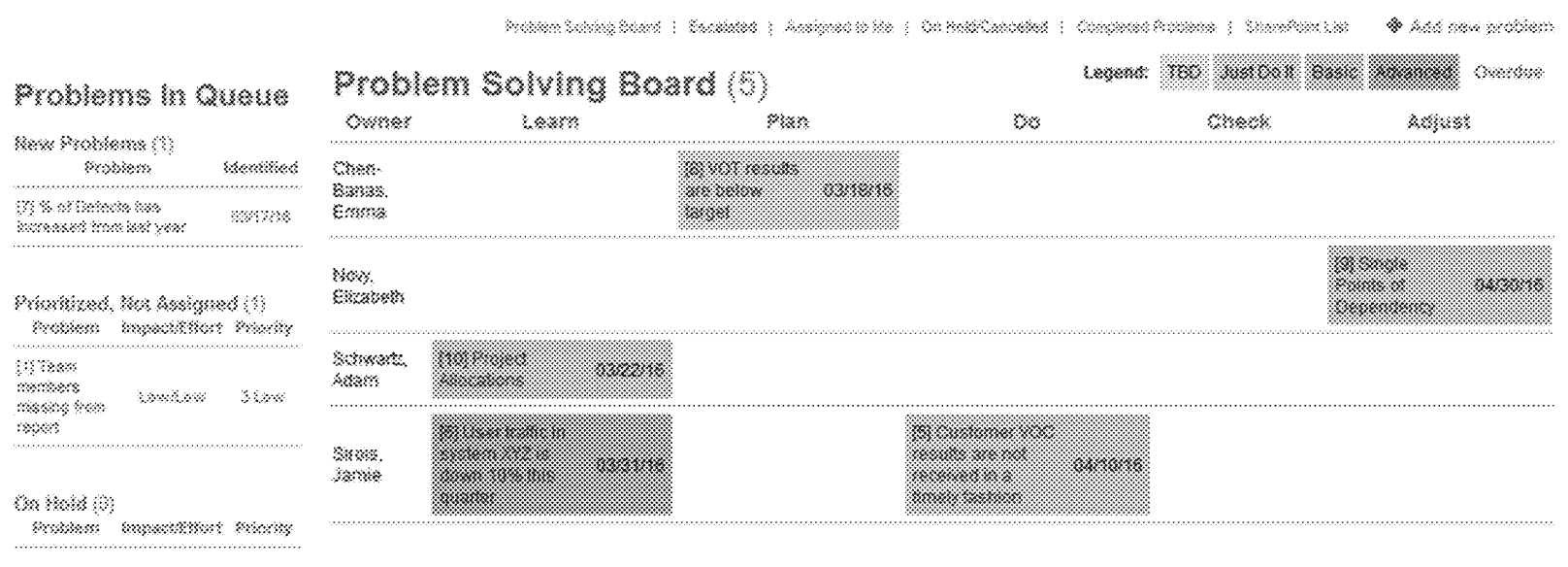

FIG. 19C is an example user interface presenting an electronic problem solving board. The electronic problem solving board identifies problems in queue, including new problems, prioritized and not assigned problems, and problems on hold. The electronic problem solving board identifies the owner of the problem (according to the data record associated with that problem). For each problem, the problem solving board shows the problem in the appropriate stage of problem solving (e.g., learn, plan, do, check, and adjust). Although these stages are shown, it is intended that any stage names or phases can be used on such a board. When the problem is associated with a particular stage, it can be presented using a color indicator of complexity. For example, a gray color may represent that the complexity is not yet determined; a pink color represents a simple complexity; a blue color represents a basic complexity; a yellow color represents an advanced complexity; and red text can indicate that a problem is overdue. Within the electronic problem solving board, a user can visualize the stages of the various problems and their associated complexities, along with the owners of each problem.

Figure 19D:
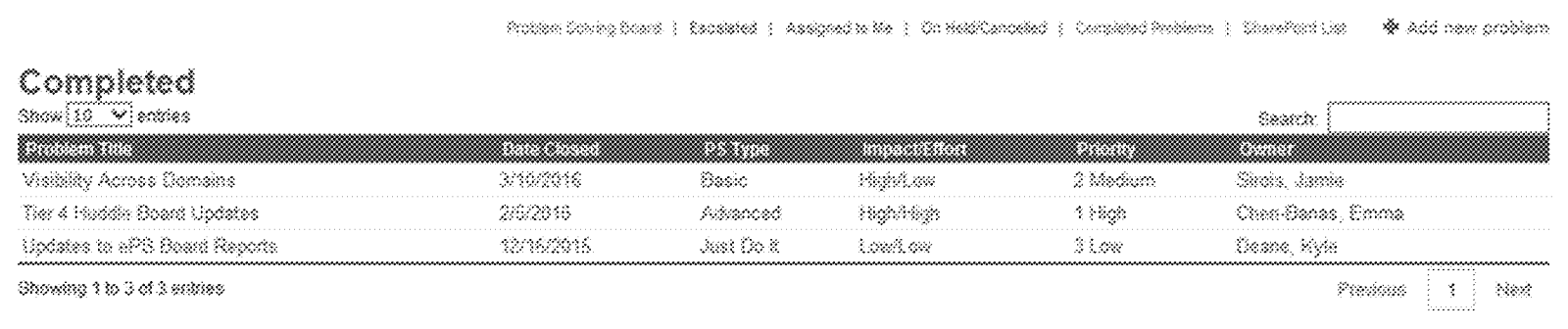

FIG. 19D is an example user interface presenting a listing of which problems have a data record indicating that the problem has been completed. The data record indicates the date the problem was closed, the problem solving type (e.g., complexity), an impact and effort (e.g., ranging from low to high), a priority (e.g., low, medium, high), and an owner.

Figure 19E:
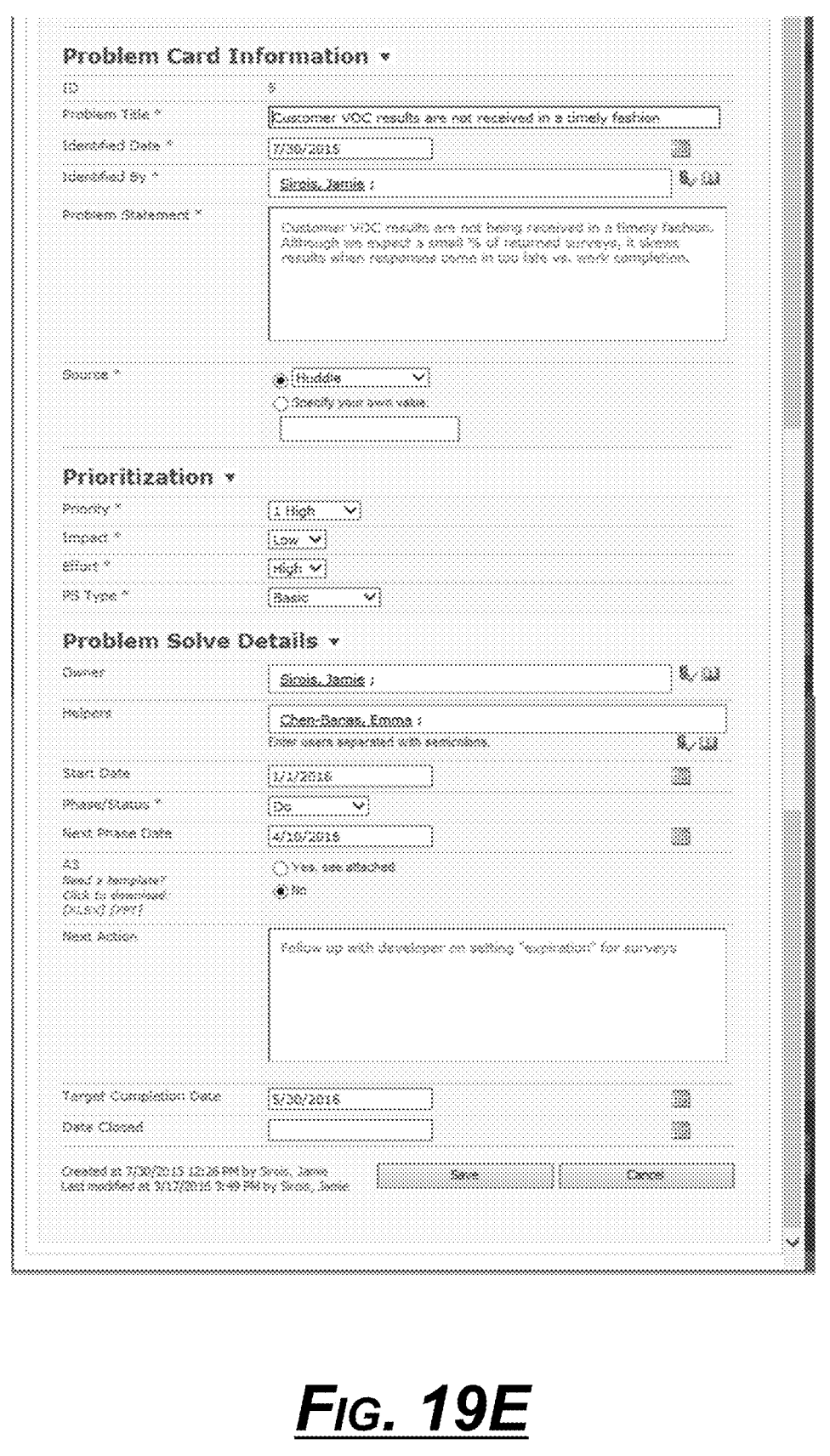

FIG. 19E is an example user interface presenting a problem card, which allows a user to update information on a data record of a problem. The problem card can include a problem title, identified date, name of a user who identified the problem, a problem statement, a source, a prioritization, impact, effort, a problem solving type, an owner of the problem, helpers or assistants of the problem, a start date of the problem, a phase or status of the problem, a next phase date, a next action, a target completion date, and a date closed. Once the date closed entry is inputted, the user interface in FIG. 19D is updated to reflect the closed problem.

By executing the exemplary methods using the exemplary operating environments, big data analytics and data mining techniques can be implemented for a more efficient and faster processing of larger data sets. In this way, efficiencies are created by providing ways to automatically classify and manage problems. These features allow performing large work such as heavy calculations and time consuming analysis in a more efficient manner than other conventional approaches.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:

generating, by an analytics engine server, a new data record containing data representing a problem, wherein the new data record is stored in a database, and the database comprises data records containing data representing previous problems, a status of a resolution of each of the previous problems, and metadata in each data record containing at least one keyword associated with corresponding previous problems;

executing, by the analytics engine server, a machine learning model that utilizes a collaborative filtering algorithm to determine a classification of the new data record and a complexity score for the problem, the analytics engine server further executing the collaborative filtering algorithm to identify a similarity score for the problem and each of the previous problems based on their respective complexity scores and classifications;

identifying, by the analytics engine server, a previous problem similar to the problem based on a similarity score of the problem and the previous problem satisfying a threshold;

generating, by the analytics engine server, a query of the metadata in the data records in the database that contain a keyword in the metadata of the data record representing the previous problem, wherein the query is based upon metadata of the new data record containing at least one keyword in the new data record and based upon the complexity score of the problem;

generating, by the analytics engine server, a data file containing the data records that satisfy the query;

determining, by the analytics engine server, whether one of the data records in the data file that satisfies the query has a change in the status of the resolution;

generating, by the analytics engine server, a graphical user interface configured for presentation on a display of a user computing device, the graphical user interface comprising a message containing data associated with the data record that has the change in the status of the resolution and a suggested solution for the problem, the suggested solution containing an indication of at least one of recommended team members, recommended tools, or performance indicators, wherein the data record contains the previous problem and the status of the resolution; and wherein the suggested solution is based on the new data record, the classification of the new data record, and the complexity score of the problem.

2. The method according to claim 1, wherein determining, by the analytics engine server, whether one of the data records in the data file that satisfies the query has the change further comprises determining whether any data record in the data file has been edited.

3. The method according to claim 1, wherein generating, by the analytics engine server, the graphical user interface further comprises generating an alert transmitted to the user computing device.

4. The method according to claim 3, wherein the alert is a text message.

5. The method according to claim 3, wherein the alert is an email message.

6. The method according to claim 3, wherein the alert is a web page.

7. The method according to claim 6, wherein the web page is generated upon an activation of a link on the user computing device.

8. The method according to claim 1, wherein the data file containing the data records that satisfy the query comprises data records containing data that represents a target completion date earlier than a target completion date represented by data in the new data record.

9. The method according to claim 1, further comprising:
generating, by the analytics engine server, a data file comprising data records representing problems that have a categorized stage of resolution status that is less advanced than the categorized stage of resolution status of the problem represented by the new data record.

10. A computer based system comprising:
a database comprising data records, wherein each data records contains data representing previous problems, a status of a resolution of the previous problems, and metadata containing at least one keyword associated with the previous problem;
an analytics engine server configured to:
generate a new data record containing data representing a problem;
provide instructions to store the new data record in the database;
execute a machine learning model that utilizes a collaborative filtering algorithm to determine a classification of the new data record and a complexity score for the problem, the analytics engine server further executing the collaborative filtering algorithm to identify a similarity score for the problem and each of the previous problems based on their respective complexity scores and classifications;
identify a previous problem similar to the problem based on a similarity score of the problem and the previous problem satisfying a threshold;
generate a query of the metadata in the data records in the database that contain a keyword in the metadata of the data records in the database representing the previous problem, wherein the query is based upon metadata of the new data record containing at least one keyword in the new data record and based upon the complexity score of the problem;
generate a data file containing the data records that satisfy the query;
determine whether one of the data records in the data file that satisfies the query has a change in the status of the resolution; and
generate a graphical user interface configured for presentation on a display of a user computing device, the graphical user interface comprising a message containing data associated with the data records in the database that has the change in the status of the resolution and a suggested solution for the problem, the suggested solution contains an indication of at least one of recommend team members, recommended tools, or performance indicators, wherein:
the data record contains the previous problem and the status of the resolution; and
the suggested solution is based on the new data record, the classification of the new data record, and the complexity score of the problem.

11. The system according to claim 10, wherein the analytics engine server is further configured to determine whether any data record in the data file has been edited.

12. The system according to claim 10, wherein the analytics engine server is further configured to generate an alert transmitted to the user computing device.

13. The system according to claim 12, wherein the alert is a text message.

14. The system according to claim 12, wherein the alert is an email message.

15. The system according to claim 12, wherein the alert is a web page.

16. The system according to claim 15, wherein the analytics engine server is further configured to generate the web page upon an activation of a link on the user computing device.

17. The system according to claim 10, wherein the data file containing the data records that satisfy the query comprises data records containing data that represents a target completion date earlier than a target completion date represented by data in the new data record.

18. The system according to claim 10, wherein the analytics engine server further comprises a data file comprising data records representing problems that have a categorized stage of resolution status that is less advanced than the categorized stage of resolution status of the problem represented by the new data record.

* * * * *